US011829103B2

United States Patent
Noguchi et al.

(10) Patent No.: US 11,829,103 B2
(45) Date of Patent: *Nov. 28, 2023

(54) ELECTROSTATIC IMAGE DEVELOPING TONER, ELECTROSTATIC IMAGE DEVELOPER, AND TONER CARTRIDGE

(71) Applicant: FUJIFILM Business Innovation Corp., Tokyo (JP)

(72) Inventors: Daisuke Noguchi, Kanagawa (JP); Atsushi Sugawara, Kanagawa (JP); Yoshimasa Fujihara, Kanagawa (JP); Shintaro Anno, Kanagawa (JP); Satoshi Miura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 17/148,881

(22) Filed: Jan. 14, 2021

(65) Prior Publication Data

US 2022/0091527 A1   Mar. 24, 2022

(30) Foreign Application Priority Data

Sep. 23, 2020 (JP) .................................. 2020-159120

(51) Int. Cl.
| | | |
|---|---|---|
| *G03G 9/087* | (2006.01) | |
| *G03G 9/08* | (2006.01) | |
| *G03G 9/097* | (2006.01) | |
| *C08G 63/52* | (2006.01) | |
| *C08G 63/06* | (2006.01) | |
| *C08F 212/08* | (2006.01) | |

(52) U.S. Cl.
CPC ....... *G03G 9/08755* (2013.01); *C08F 212/08* (2013.01); *C08G 63/06* (2013.01); *C08G 63/52* (2013.01); *G03G 9/0819* (2013.01); *G03G 9/0821* (2013.01); *G03G 9/0825* (2013.01); *G03G 9/08711* (2013.01); *G03G 9/09733* (2013.01); *G03G 2215/0614* (2013.01)

(58) Field of Classification Search
None
See application file for complete search history.

(56) References Cited

U.S. PATENT DOCUMENTS

| | | | |
|---|---|---|---|
| 8,652,739 B2 | 2/2014 | Kobayashi et al. | |
| 11,353,803 B2 * | 6/2022 | Sugawara | G03G 9/08755 |

FOREIGN PATENT DOCUMENTS

| | | | |
|---|---|---|---|
| JP | 2004-287421 A | 10/2004 | |
| JP | 2012-68307 A | 4/2012 | |

(Continued)

OTHER PUBLICATIONS

Translation of JP 2018-066902.*

*Primary Examiner* — Peter L Vajda
(74) *Attorney, Agent, or Firm* — Sughrue Mion, PLLC

(57) ABSTRACT

An electrostatic image developing toner includes an amorphous polyester resin and a crystalline polyester resin, wherein a Net intensity $N_{Na}$ of a Na element and a Net intensity $N_{Cl}$ of a Cl element, the Net intensities $N_{Na}$ and $N_{Cl}$ being determined by X-ray fluorescence analysis, satisfy $2.5 \leq N_{Cl}/N_{Na} \leq 260.0$.

14 Claims, 3 Drawing Sheets

(56) References Cited

FOREIGN PATENT DOCUMENTS

| JP | 2017-003990 A | | 1/2017 | |
|----|---------------|---|--------|--|
| JP | 2018-066902 | * | 4/2018 | ............. G03G 9/087 |
| JP | 2019-040024 A | | 3/2019 | |

* cited by examiner

ELECTROSTATIC IMAGE DEVELOPING TONER, ELECTROSTATIC IMAGE DEVELOPER, AND TONER CARTRIDGE

CROSS-REFERENCE TO RELATED APPLICATIONS

This application is based on and claims priority under 35 USC 119 from Japanese Patent Application No. 2020-159120 filed Sep. 23, 2020.

BACKGROUND

(i) Technical Field

The present disclosure relates to an electrostatic image developing toner, an electrostatic image developer, and a toner cartridge.

(ii) Related Art

Japanese Laid Open Patent Application Publication No. 2012-068307 discloses an electrostatic image developing toner including toner particles in which ammonium ions remain and silica particles that contain a chlorine compound and serve as external additive particles.

Japanese Laid Open Patent Application Publication No. 2004-287421 discloses an electrostatic image developing toner including a binder resin and a colorant, wherein the binder resin is a polyester or polyol resin and particles of the toner contain 0.007% to 0.140% by mass of aluminum and 0.002% to 0.412% by mass of chlorine and have an average circularity of 0.94 to 0.99 and an average equivalent circle diameter of 2.6 to 74 μm.

Japanese Laid Open Patent Application Publication No. 2019-040024 discloses a toner that includes toner particles constituted by a toner core including a material produced by melt-kneading an amorphous resin with a crystalline resin and a shell layer including a thermosetting resin, wherein the melt-kneaded material includes plural crystalline resin domains and the proportion of specific crystalline resin domains having a minor axis length of 50 nm or more and 200 nm or less and an aspect ratio of 4.0 or more and 20.0 or less to all the crystalline resin domains is 80% or more by number.

Japanese Laid Open Patent Application Publication No. 2017-003990 discloses a toner including toner particles including an amorphous polyester resin, a crystalline polyester resin, and a wax, wherein domains composed of the wax and crystals of the crystalline polyester resin are present, the proportion of the area of the wax domains to the cross-sectional area of the toner particle is 0.5% or more and 8.0% or less, the proportion of the area of the crystals of the crystalline polyester resin to the cross-sectional area of the toner particle is 0.5% or more and 8.0% or less, the wax domains have a number average diameter of 60 nm or more and 240 nm or less, the crystals of the crystalline polyester resin have an aspect ratio of 5.0 or more and 25.0 or less, and the number average major axis length of the crystals of the crystalline polyester resin is 0.8 times or more and 2.0 times or less the number average diameter of the wax domains.

SUMMARY

Aspects of non-limiting embodiments of the present disclosure relate to an electrostatic image developing toner including an amorphous polyester resin and a crystalline polyester resin, the electrostatic image developing toner being excellent in terms of the degree of fixation of halftone images compared with an electrostatic image developing toner including an amorphous polyester resin and a crystalline polyester resin, wherein the Net intensity $N_{Na}$ of a Na element and the Net intensity $N_{Cl}$ of a Cl element, the Net intensities $N_{Na}$ and $N_{Cl}$ being determined by X-ray fluorescence analysis, satisfy $2.5 > N_{Cl}/N_{Na}$.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic image developing toner including an amorphous polyester resin and a crystalline polyester resin, wherein a Net intensity $N_{Na}$ of a Na element and a Net intensity $N_{Cl}$ of a Cl element, the Net intensities $N_{Na}$ and $N_{Cl}$ being determined by X-ray fluorescence analysis, satisfy $2.5 \leq N_{Cl}/N_{Na} \leq 260.0$.

BRIEF DESCRIPTION OF THE DRAWINGS

Exemplary embodiments of the present disclosure will be described in detail based on the following figures, wherein.

DETAILED DESCRIPTION

Figure 1:
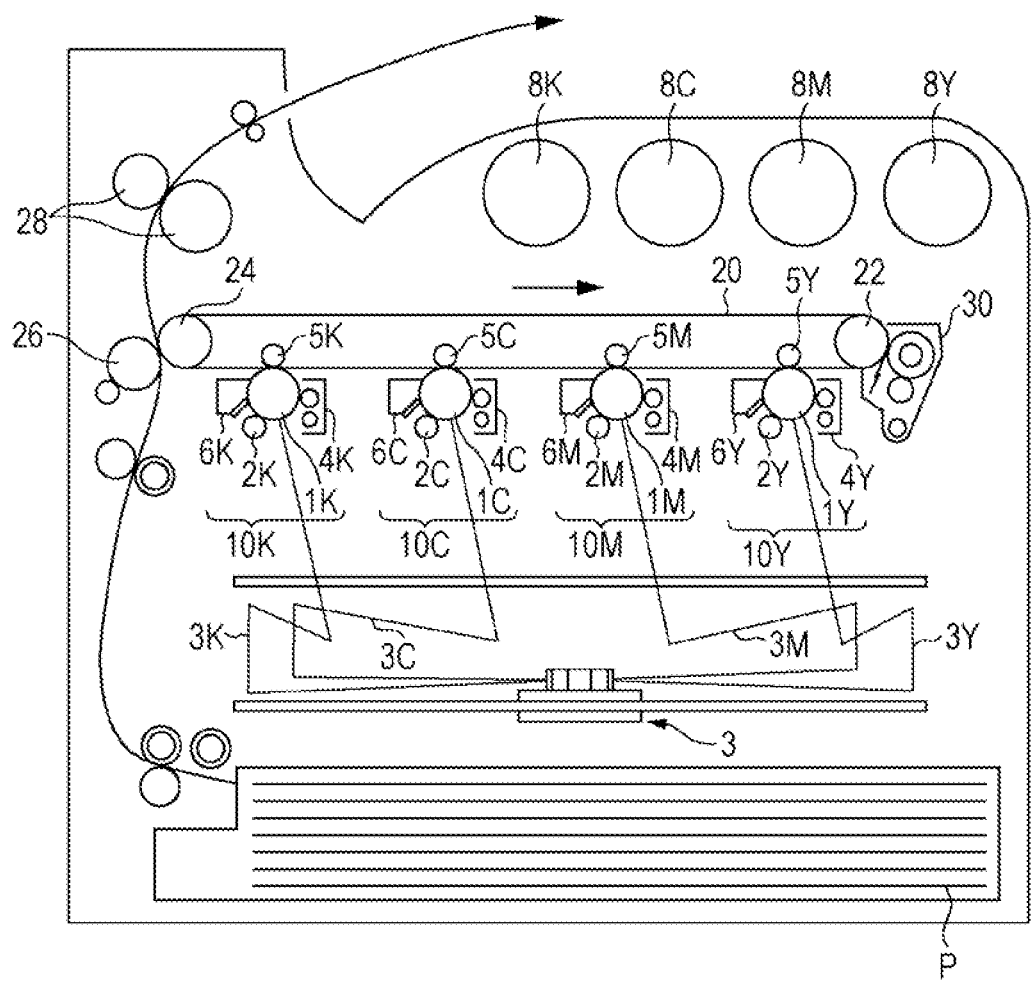
FIG. 1 is a schematic diagram illustrating an example of an image forming apparatus according to an exemplary embodiment.

An exemplary embodiment of the present disclosure is described below. The following description and Examples below are intended to be illustrative of the exemplary embodiment and not restrictive of the scope of the exemplary embodiment.

In the present disclosure, a numerical range expressed using "to" means the range specified by the minimum and maximum described before and after "to", respectively.

In the present disclosure, when numerical ranges are described in a stepwise manner, the upper or lower limit of a numerical range may be replaced with the upper or lower limit of another numerical range, respectively. In the present disclosure, the upper and lower limits of a numerical range may be replaced with the upper and lower limits described in Examples below.

The term "step" used herein refers not only to an individual step but also to a step that is not distinguishable from other steps but achieves the intended purpose of the step.

In the present disclosure, when an exemplary embodiment is described with reference to a drawing, the structure of the exemplary embodiment is not limited to the structure illustrated in the drawing. The sizes of the members illustrated in the attached drawings are conceptual and do not limit the relative relationship among the sizes of the members.

Each of the components described in the present disclosure may include plural types of substances that correspond to the component. In the present disclosure, in the case where a composition includes plural substances that correspond to a component of the composition, the content of the component in the composition is the total content of the plural substances in the composition unless otherwise specified.

In the present disclosure, the number of types of particles that correspond to a component may be two or more. In the case where a composition includes plural types of particles that correspond to a component of the composition, the particle size of the component is the particle size of a mixture of the plural types of particles included in the composition unless otherwise specified.

In the present disclosure, an electrostatic image developing toner may be referred to simply as "toner", and an electrostatic image developer may be referred to simply as "developer".

Electrostatic Image Developing Toner

A toner according to the exemplary embodiment includes an amorphous polyester resin and a crystalline polyester resin, wherein the Net intensity $N_{Na}$ of a Na element and the Net intensity $N_{Cl}$ of a Cl element, the Net intensities $N_{Na}$ and $N_{Cl}$ being determined by X-ray fluorescence analysis, satisfy $2.5 \leq N_{Cl}/N_{Na} \leq 260.0$.

The toner according to the exemplary embodiment may be excellent in terms of the degree of fixation of halftone images on recording media. The mechanisms are presumably as follows.

The toner may include Na ions, which are derived from a colorant, the dispersant used when toner particles are produced by a wet process, or the like. It is considered that the Na ions combine with the binder resin to form ionic crosslinks on the surfaces of toner particles and consequently harden the surfaces of toner particles. Toner particles having hardened surfaces may be less likely to be melted when heat is applied to the toner particles. As a result, the degree of fixation of toner images on recording media and, in particular, the degree of fixation of halftone images may be reduced.

In contrast, in the case where the toner includes Cl ions, the Cl ions combine with the Na ions to form a salt. This may reduce the formation of the ionic crosslinks between the Na ions and the binder resin and limit the hardening of the surfaces of toner particles. Consequently, images formed using a toner including Cl ions may be readily melted as intended when heat is applied to the images and the degree of fixation of halftone images on recording media may be increased.

If the ratio $N_{Cl}/N_{Na}$ of the Net intensity $N_{Cl}$ of the Cl element included in the toner to the Net intensity $N_{Na}$ of the Na element included in the toner is less than 2.5, the above-described action of the Cl ions on the Na ions may be insufficient and the degree of fixation of halftone images may be low. From the above viewpoint, the ratio $N_{Cl}/N_{Na}$ is 2.5 or more, is preferably 3.0 or more, and is more preferably 4.0 or more.

If the ratio $N_{Cl}/N_{Na}$ of the Net intensity $N_{Cl}$ of the Cl element included in the toner to the Net intensity $N_{Na}$ of the Na element included in the toner is more than 260.0, the Cl ions may cause second transfer failure. From the above viewpoint, the ratio $N_{Cl}/N_{Na}$ is 260.0 or less, is preferably 150.0 or less, and is more preferably 60.0 or less.

The Net intensities $N_{Na}$ and $N_{Cl}$ of Na and Cl elements may be measured by the following method.

About 200 mg of the toner (when the toner includes an external additive, the weight of the external additive is included in the calculation) is compressed at a load of 10 t for 60 seconds with a compression molding machine to form a disc having a diameter of 10 mm and a thickness of 2 mm. Using the disc as an sample, an all-element analysis is conducted at a tube voltage of 40 kV and a tube current of 70 mA with a scanning X-ray fluorescence analyzer "ZSX Primus II" produced by Rigaku Corporation in order to determine the Net intensities (unit: kilo counts per second, kcps) of Na and Cl elements.

The Cl ions may be added to the toner by, for example, using a chloride in the production of toner particles. Examples of the chloride include ammonium chloride.

The Net intensity $N_{Cl}$ of the Cl element included in the toner according to the exemplary embodiment which is determined by X-ray fluorescence analysis is preferably 0.10 kcps or more and 1.30 kcps or less, is more preferably 0.11 kcps or more and 1.20 kcps or less, and is further preferably 0.12 kcps or more and 1.10 kcps or less in order to increase the degree of fixation of halftone images and reduce the second transfer failure.

The Net intensity $N_{Na}$ of the Na element included in the toner according to the exemplary embodiment which is determined by X-ray fluorescence analysis is preferably, but not limited to, 0.005 kcps or more and 0.040 kcps or less, is more preferably 0.007 kcps or more and 0.035 kcps or less, and is further preferably 0.010 kcps or more and 0.030 kcps or less.

Details of the toner according to the exemplary embodiment are described below.

The toner according to the exemplary embodiment includes toner particles and, as needed, an external additive.

Toner Particles

The toner particles include, for example, a binder resin and may optionally include a colorant, a release agent, and other additives.

Binder Resin

The binder resin includes at least an amorphous polyester resin and a crystalline polyester resin.

The term "crystalline polyester resin" used herein refers to a polyester resin that, in thermal analysis using differential scanning calorimetry (DSC), exhibits a distinct endothermic peak instead of step-like endothermic change and specifically refers to a polyester resin that exhibits an endothermic peak with a half-width of 10° C. or less at a heating rate of 10° C./min.

On the other hand, the term "amorphous polyester resin" used herein refers to a polyester resin that exhibits an endothermic peak with a half-width of more than 10° C. at a heating rate of 10° C./min, a polyester resin that exhibits step-like endothermic change, or a polyester resin that does not exhibit a distinct endothermic peak.

Amorphous Polyester Resin

Examples of the amorphous polyester resin include condensation polymers of a polyvalent carboxylic acid and a polyhydric alcohol. The amorphous polyester resin may be a commercially available one or a synthesized one.

Examples of the polyvalent carboxylic acid include aliphatic dicarboxylic acids, such as oxalic acid, malonic acid, maleic acid, fumaric acid, citraconic acid, itaconic acid, glutaconic acid, succinic acid, alkenyl succinic acid, adipic acid, and sebacic acid; alicyclic dicarboxylic acids, such as cyclohexanedicarboxylic acid; aromatic dicarboxylic acids, such as terephthalic acid, isophthalic acid, phthalic acid, and naphthalenedicarboxylic acid; anhydrides of these dicarboxylic acids; and lower (e.g., 1 to 5 carbon atoms) alkyl esters of these dicarboxylic acids. Among these polyvalent carboxylic acids, aromatic dicarboxylic acids may be used.

Trivalent or higher carboxylic acids having a crosslinked structure or a branched structure may be used as a polyvalent carboxylic acid in combination with the dicarboxylic acids. Examples of the trivalent or higher carboxylic acids include trimellitic acid, pyromellitic acid, anhydrides of these carboxylic acids, and lower (e.g., 1 to 5 carbon atoms) alkyl esters of these carboxylic acids.

The above polyvalent carboxylic acids may be used alone or in combination of two or more.

Examples of the polyhydric alcohol include aliphatic diols, such as ethylene glycol, diethylene glycol, triethylene glycol, propylene glycol, butanediol, hexanediol, and neopentyl glycol; alicyclic diols, such as cyclohexanediol, cyclohexanedimethanol, and hydrogenated bisphenol A; and aromatic diols, such as bisphenol A-ethylene oxide adduct and bisphenol A-propylene oxide adduct. Among these polyhydric alcohols, aromatic diols and alicyclic diols may be used. In particular, aromatic diols may be used.

Trihydric or higher alcohols having a crosslinked structure or a branched structure may be used as a polyhydric alcohol in combination with the diols. Examples of the trihydric or higher alcohols include glycerin, trimethylolpropane, and pentaerythritol.

The above polyhydric alcohols may be used alone or in combination of two or more.

The glass transition temperature Tg of the amorphous polyester resin is preferably 50° C. or more and 80° C. or less and is more preferably 50° C. or more and 65° C. or less.

The glass transition temperature of the amorphous polyester resin is determined from a differential scanning calorimetry (DSC) curve obtained by DSC. More specifically, the glass transition temperature of the amorphous polyester resin is determined from the "extrapolated glass-transition-starting temperature" according to a method for determining glass transition temperature which is described in JIS K 7121:1987 "Testing Methods for Transition Temperatures of Plastics".

The weight average molecular weight Mw of the amorphous polyester resin is preferably 5,000 or more and 1,000,000 or less and is more preferably 7,000 or more and 500,000 or less. The number average molecular weight Mn of the amorphous polyester resin may be 2,000 or more and 100,000 or less. The molecular weight distribution index Mw/Mn of the amorphous polyester resin is preferably 1.5 or more and 100 or less and is more preferably 2 or more and 60 or less.

The weight average molecular weight and number average molecular weight of the amorphous polyester resin are determined by gel permeation chromatography (GPC). Specifically, the molecular weights of the amorphous polyester resin are determined by GPC using a "HLC-8120GPC" produced by Tosoh Corporation as measuring equipment, a column "TSKgel SuperHM-M (15 cm)" produced by Tosoh Corporation, and a tetrahydrofuran (THF) solvent. The weight average molecular weight and number average molecular weight of the amorphous polyester resin are determined on the basis of the results of the measurement using a molecular-weight calibration curve based on monodisperse polystyrene standard samples.

The amorphous polyester resin may be produced by any suitable production method known in the related art. Specifically, the amorphous polyester resin may be produced by, for example, a method in which polymerization is performed at 180° C. or more and 230° C. or less, the pressure inside the reaction system is reduced as needed, and water and alcohols that are generated by condensation are removed. In the case where the raw materials, that is, the monomers, are not dissolved in or miscible with each other at the reaction temperature, a solvent having a high boiling point may be used as a dissolution adjuvant in order to dissolve the raw materials. In such a case, the condensation polymerization reaction is performed while the dissolution adjuvant is distilled away. In the case where the monomers used in the copolymerization reaction have low miscibility with each other, a condensation reaction of the monomers with an acid or alcohol that is to undergo a polycondensation reaction with the monomers may be performed in advance and subsequently polycondensation of the resulting polymers with the other components may be performed.

The amorphous polyester resin may be a modified amorphous polyester resin as well as an unmodified amorphous polyester resin. The modified amorphous polyester resin is an amorphous polyester resin including a bond other than an ester bond or an amorphous polyester resin including a resin component other than a polyester, the resin component being bonded to the amorphous polyester resin with a covalent bond, an ionic bond, or the like. Examples of the modified amorphous polyester resin include a terminal-modified amorphous polyester resin produced by reacting an amorphous polyester resin having a functional group, such as an isocyanate group, introduced at the terminal with an active hydrogen compound.

The proportion of the amorphous polyester resin in the entire binder resin is preferably 60% by mass or more and 98% by mass or less, is more preferably 65% by mass or more and 95% by mass or less, and is further preferably 70% by mass or more and 90% by mass or less.

Crystalline Polyester Resin

Examples of the crystalline polyester resin include condensation polymers of a polyvalent carboxylic acid and a polyhydric alcohol. The crystalline polyester resin may be commercially available one or a synthesized one.

In order to increase ease of forming a crystal structure, a condensation polymer prepared from linear aliphatic polymerizable monomers may be used as a crystalline polyester resin instead of a condensation polymer prepared from polymerizable monomers having an aromatic ring.

Examples of the polyvalent carboxylic acid include aliphatic dicarboxylic acids, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acids, such as dibasic acids (e.g., phthalic acid, isophthalic acid, terephthalic acid, and naphthalene-2, 6-dicarboxylic acid); anhydrides of these dicarboxylic acids; and lower (e.g., 1 to 5 carbon atoms) alkyl esters of these dicarboxylic acids.

Trivalent or higher carboxylic acids having a crosslinked structure or a branched structure may be used as a polyvalent carboxylic acid in combination with the dicarboxylic acids. Examples of the trivalent carboxylic acids include aromatic carboxylic acids, such as 1,2,3-benzenetricarboxylic acid, 1,2,4-benzenetricarboxylic acid, and 1,2,4-naphthalenetricarboxylic acid; anhydrides of these tricarboxylic acids; and lower (e.g., 1 to 5 carbon atoms) alkyl esters of these tricarboxylic acids.

Dicarboxylic acids including a sulfonic group and dicarboxylic acids including an ethylenic double bond may be used as a polyvalent carboxylic acid in combination with the above dicarboxylic acids.

The above polyvalent carboxylic acids may be used alone or in combination of two or more.

Examples of the polyhydric alcohol include aliphatic diols, such as linear aliphatic diols including a backbone having 7 to 20 carbon atoms. Examples of the aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among these aliphatic diols, 1,8-octanediol, 1,9-nonanediol, and 1,10-decanediol may be used.

Trihydric or higher alcohols having a crosslinked structure or a branched structure may be used as a polyhydric alcohol in combination with the above diols. Examples of the trihydric or higher alcohols include glycerin, trimethylolethane, trimethylolpropane, and pentaerythritol.

The above polyhydric alcohols may be used alone or in combination of two or more.

The content of the aliphatic diols in the polyhydric alcohol may be 80 mol % or more and is preferably 90 mol % or more.

The melting temperature of the crystalline polyester resin is preferably 50° C. or more and 100° C. or less, is more preferably 55° C. or more and 90° C. or less, and is further preferably 60° C. or more and 85° C. or less.

The melting temperature of the crystalline polyester resin is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The crystalline polyester resin may have a weight average molecular weight Mw of 6,000 or more and 35,000 or less.

The crystalline polyester resin may be produced by any suitable method known in the related art similarly to, for example, the amorphous polyester resin.

The crystalline polyester resin may be a polymer of an α,ω-linear aliphatic dicarboxylic acid with an α,ω-linear aliphatic diol in order to readily form the crystal structure, enhance compatibility with the amorphous polyester resin, and thereby increase the degree of fixation of halftone images.

The α,ω-linear aliphatic dicarboxylic acid may be an α,ω-linear aliphatic dicarboxylic acid that includes two carboxyl groups connected to each other with an alkylene group having 3 to 14 carbon atoms. The number of carbon atoms included in the alkylene group is preferably 4 to 12 and is further preferably 6 to 10.

Examples of the α,ω-linear aliphatic dicarboxylic acid include succinic acid, glutaric acid, adipic acid, 1,6-hexanedicarboxylic acid (common name: suberic acid), 1,7-heptanedicarboxylic acid (common name: azelaic acid), 1,8-octanedicarboxylic acid (common name: sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Among these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferable.

The above α,ω-linear aliphatic dicarboxylic acids may be used alone or in combination of two or more.

The α,ω-linear aliphatic diol may be an α,ω-linear aliphatic diol that includes two hydroxyl groups connected to each other with an alkylene group having 3 to 14 carbon atoms. The number of carbon atoms included in the alkylene group is preferably 4 to 12 and is further preferably 6 to 10.

Examples of the α,ω-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among these, 1,6-hexanediol, 1,7-heptanediol, 1,8-octanediol, 1,9-nonanediol, and 1,10-decanediol are preferable.

The above α,ω-linear aliphatic diols may be used alone or in combination of two or more.

The polymer of the α,ω-linear aliphatic dicarboxylic acid with the α,ω-linear aliphatic diol is preferably a polymer of at least one dicarboxylic acid selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid with at least one diol selected from the group consisting of 1,6-hexanediol, 1,7-heptanediol, 1,8-octanediol, 1,9-nonanediol, and 1,10-decanediol, in order to readily form a crystal structure, enhance compatibility with the amorphous polyester resin, and thereby increase the degree of fixation of halftone images. In particular, a polymer of 1,10-decanedicarboxylic acid with 1,6-hexanediol is more preferable.

The proportion of the crystalline polyester resin in the entire binder resin is preferably 1% by mass or more and 20% by mass or less, is more preferably 2% by mass or more and 15% by mass or less, and is further preferably 3% by mass or more and 10% by mass or less.

Styrene Acrylic Resin

Examples of the binder resin include a styrene acrylic resin. The styrene acrylic resin may be an amorphous resin.

Examples of the styrene-based monomer constituting the styrene acrylic resin include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. The above styrene-based monomers may be used alone or in combination of two or more.

Examples of the (meth)acryl-based monomer constituting the styrene acrylic resin include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. The above (meth)acryl-based monomers may be used alone or in combination of two or more. The term "(meth)acryl" used herein refers to both "acryl" and "methacryl".

The polymerization ratio between the styrene-based monomer and the (meth)acryl-based monomer, that is, Styrene-based monomer:(Meth)acryl-based monomer, may be 70:30 to 95:5 by mass.

The styrene acrylic resin may include a crosslinked structure. The styrene acrylic resin including a crosslinked structure may be produced by, for example, copolymerization of the styrene-based monomer, the (meth)acryl-based monomer, and a crosslinkable monomer. The crosslinkable monomer may be, but not limited to, a difunctional or higher (meth)acrylate.

The method for preparing the styrene acrylic resin is not limited. For example, solution polymerization, precipitation polymerization, suspension polymerization, bulk polymerization, and emulsion polymerization may be used. The polymerization reaction may be conducted by any suitable process known in the related art, such as a batch process, a semi-continuous process, or a continuous process.

The proportion of the styrene acrylic resin in the entire binder resin is preferably 0% by mass or more and 20% by mass or less, is more preferably 1% by mass or more and 15% by mass or less, and is further preferably 2% by mass or more and 10% by mass or less.

Other Binder Resin

Examples of the other binder resin include homopolymers of the following monomers and copolymers of two or more monomers selected from the following monomers: ethylenically unsaturated nitriles, such as acrylonitrile and methacrylonitrile; vinyl ethers, such as vinyl methyl ether and vinyl isobutyl ether; vinyl ketones, such as vinyl methyl ketone, vinyl ethyl ketone, and vinyl isopropenyl ketone; and olefins, such as ethylene, propylene, and butadiene.

Examples of the other binder resin further include non-vinyl resins, such as epoxy resins, polyurethane resins, polyamide resins, cellulose resins, polyether resins, and modified rosins; a mixture of the non-vinyl resin and the vinyl resin; and a graft polymer produced by polymerization of the vinyl monomer in the presence of the non-vinyl resin.

The above binder resins may be used alone or in combination of two or more.

The content of the binder resin in the entire toner particles is preferably 40% by mass or more and 95% by mass or less, is more preferably 50% by mass or more and 90% by mass or less, and is further preferably 60% by mass or more and 85% by mass or less.

Colorant

Examples of the colorant include pigments, such as Carbon Black, Chrome Yellow, Hansa Yellow, Benzidine Yellow, Threne Yellow, Quinoline Yellow, Pigment Yellow, Permanent Orange GTR, Pyrazolone Orange, Vulcan Orange, Watching Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The above colorants may be used alone or in combination of two or more.

The colorant may optionally be subjected to a surface treatment and may be used in combination with a dispersant. Plural types of colorants may be used in combination.

The content of the colorant in the entire toner particles is preferably 1% by mass or more and 30% by mass or less and is more preferably 3% by mass or more and 15% by mass or less.

Release Agent

Examples of the release agent include, but are not limited to, hydrocarbon waxes; natural waxes, such as a carnauba wax, a rice bran wax, and a candelilla wax; synthetic or mineral-petroleum-derived waxes, such as a montan wax; and ester waxes, such as a fatty-acid ester wax and a montanate wax.

The release agent is preferably an ester wax and is more preferably a wax that is an ester of a higher fatty acid having 10 to 30 carbon atoms with a monohydric or polyhydric alcohol having 1 to 30 carbon atoms in order to enhance compatibility with the amorphous polyester resin and thereby increase the degree of fixation of halftone images.

Examples of the ester wax include an ester of a higher fatty acid having 10 or more carbon atoms with a monohydric or polyhydric aliphatic alcohol having 8 or more carbon atoms, the ester having a melting temperature of 60° C. or more and 110° C. or less, preferably having a melting temperature of 65° C. or more and 100° C. or less, and more preferably having a melting temperature of 70° C. or more and 95° C. or less.

Examples of the ester wax include an ester of a higher fatty acid, such as caprylic acid, capric acid, lauric acid, myristic acid, palmitic acid, stearic acid, arachidic acid, behenic acid, or oleic acid, with an alcohol (e.g., a monohydric alcohol, such as methanol, ethanol, propanol, isopropanol, butanol, capryl alcohol, lauryl alcohol, myristyl alcohol, cetyl alcohol, stearyl alcohol, or oleyl alcohol; or a polyhydric alcohol, such as glycerin, ethylene glycol, propylene glycol, sorbitol, or pentaerythritol). Specific examples thereof include a carnauba wax, a rice bran wax, a candelilla wax, a jojoba oil, a Japan wax, a beeswax, a Chinese wax, lanoline, and a montanic ester wax.

The melting temperature of the release agent is preferably 50° C. or more and 110° C. or less and is more preferably 60° C. or more and 100° C. or less.

The melting temperature of the release agent is determined from the "melting peak temperature" according to a method for determining melting temperature which is described in JIS K 7121:1987 "Testing Methods for Transition Temperatures of Plastics" using a DSC curve obtained by differential scanning calorimetry (DSC).

The content of the release agent in the entire toner particles is preferably 1% by mass or more and 20% by mass or less and is more preferably 5% by mass or more and 15% by mass or less.

Other Additives

Examples of the other additives include additives known in the related art, such as a magnetic substance, a charge-controlling agent, and an inorganic powder. These additives may be added to the toner particles as internal additives.

Properties of Toner Particles

The toner particles may have a single-layer structure or a "core-shell" structure constituted by a core (i.e., core particle) and a coating layer (i.e., shell layer) covering the core.

The core-shell structure of the toner particles may be constituted by, for example, a core including a binder resin and, as needed, other additives such as a colorant and a release agent and by a coating layer including the binder resin.

The volume average diameter D50v of the toner particles is preferably 2 μm or more and 10 μm or less and is more preferably 4 μm or more and 8 μm or less.

The various average particle sizes and various particle size distribution indices of the toner particles are measured using "COULTER MULTISIZER II" produced by Beckman Coulter, Inc. with an electrolyte "ISOTON-II" produced by Beckman Coulter, Inc. in the following manner.

A sample to be measured (0.5 mg or more and 50 mg or less) is added to 2 ml of a 5 mass %-aqueous solution of a surfactant (e.g., sodium alkylbenzene sulfonate) that serves as a dispersant. The resulting mixture is added to 100 ml or more and 150 ml or less of an electrolyte.

The resulting electrolyte containing the sample suspended therein is subjected to a dispersion treatment for 1 minute using an ultrasonic disperser, and the distribution of the diameters of particles having a diameter of 2 μm or more and 60 μm or less is measured using COULTER MULTISIZER II with an aperture having a diameter of 100 μm. The number of the particles sampled is 50,000.

The particle diameter distribution measured is divided into a number of particle diameter ranges (i.e., channels). For each range, in ascending order in terms of particle diameter, the cumulative volume and the cumulative number are calculated and plotted to draw cumulative distribution curves. Particle diameters at which the cumulative volume and the cumulative number reach 16% are considered to be the volume particle diameter D16v and the number particle diameter D16p, respectively. Particle diameters at which the cumulative volume and the cumulative number reach 50% are considered to be the volume average particle diameter D50v and the number average particle diameter D50p, respectively. Particle diameters at which the cumulative volume and the cumulative number reach 84% are considered to be the volume particle diameter D84v and the number particle diameter D84p, respectively.

Using the volume particle diameters and number particle diameters measured, the volume particle size distribution index (GSDv) is calculated as $(D84v/D16v)^{1/2}$ and the number particle size distribution index (GSDp) is calculated as $(D84p/D16p)^{1/2}$.

The toner particles preferably has an average circularity of 0.94 or more and 1.00 or less. The average circularity of the toner particles is more preferably 0.95 or more and 0.98 or less.

The average circularity of the toner particles is determined as [Equivalent circle perimeter]/[Perimeter] (i.e., [Perimeter of a circle having the same projection area as the particles]/[Perimeter of the projection image of the particles]. Specifically, the average circularity of the toner particles is determined by the following method.

The toner particles to be measured are sampled by suction so as to form a flat stream. A static image of the particles is taken by instantaneously flashing a strobe light. The image of the particles is analyzed with a flow particle image analyzer "FPIA-3000" produced by Sysmex Corporation. The number of samples used for determining the average circularity of the toner particles is 3,500.

In the case where the toner includes an external additive, the toner (i.e., the developer) to be measured is dispersed in water containing a surfactant and then subjected to an ultrasonic wave treatment in order to remove the external additive from the toner particles.

The toner particles may be either the first toner particles or the second toner particles described below.

First Toner Particles

A toner particle that includes at least two crystalline resin domains satisfying conditions (A), (B1), (C), and (D) below when a cross section of the toner particle is observed.

Condition (A): the crystalline resin domain has an aspect ratio of 5 or more and 40 or less.

Condition (B1): the crystalline resin domain has a major axis length of 0.5 μm or more and 1.5 μm or less.

Condition (C): the angle formed by an extension of the major axis of the crystalline resin domain and a tangent to the surface of the toner particle at a point at which the extension intersects the surface of the toner particle is 60° or more and 90° or less.

Condition (D): the angle at which extensions of the major axes of two crystalline resin domains intersect each other is 45° or more and 90° or less.

Second Toner Particles

A toner particle that includes at least two crystalline resin domains satisfying conditions (A), (B2), (C), and (D) below when a cross section of the toner particle is observed.

Condition (A): the crystalline resin domain has an aspect ratio of 5 or more and 40 or less.

Condition (B2): the ratio of the major axis length of at least one of two crystalline resin domains to the maximum diameter of the toner particle is 10% or more and 30% or less.

Condition (C): the angle formed by an extension of the major axis of the crystalline resin domain and a tangent to the surface of the toner particle at a point at which the extension intersects the surface of the toner particle is 60° or more and 90° or less.

Condition (D): the angle at which extensions of the major axes of two crystalline resin domains intersect each other is 45° or more and 90° or less.

The first toner particles may be also the second toner particles and are not necessarily the second toner particles. It is preferable that the first toner particles be also the second toner particles.

The second toner particles may be also the first toner particles and are not necessarily the first toner particles. It is preferable that the second toner particles be also the first toner particles.

Figure 3:
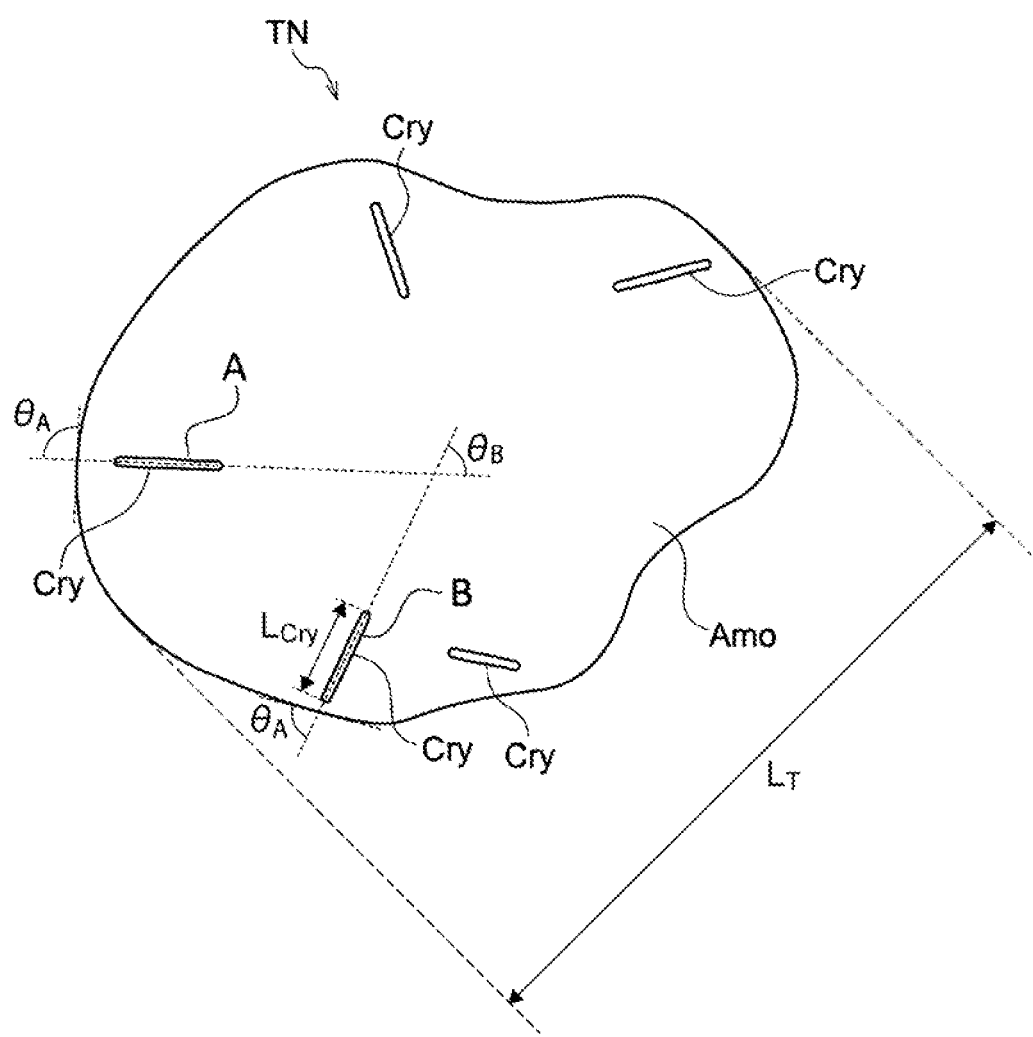
FIG. 3 is a schematic cross-sectional view of a particle of an electrostatic image developing toner according to an exemplary embodiment.

FIG. 3 is a schematic cross-sectional view of a toner particle. The meanings of the symbols used in FIG. 3 are as follows: TN: toner particle, Amo: amorphous resin, Cry: crystalline resin, $L_{Cry}$: major axis length of crystalline resin domain, $L_T$: maximum diameter of toner particle, $\theta_A$: angle formed by extension of major axis of crystalline resin domain and tangent to surface of toner particle at point at which the extension intersects the surface of the toner particle, $\theta_B$: angle at which extensions of major axes of two crystalline resin domains intersect each other.

The first or second toner particles may increase the degree of fixation of halftone images on recording media. The reasons are presumably as follows.

In the first and second toner particles, at least two elliptical or acicular crystalline resin domains having a high aspect ratio and a large major axis length are arranged to extend from the surface-side portion of each toner particle toward the inside of the toner particle and intersect one another (see FIG. 3). It is considered that, when a toner image including the above toner particles is fixed to a recording medium by applying heat to the toner particles, the heat quickly transfers from the surfaces of the toner particles toward the inside due to the melting of the elliptical or acicular crystalline resin domains. Consequently, the heat may transfer throughout the toner particles in a substantially uniform manner, the entire toner particles may become melted in a substantially uniform manner, and the degree of fixation of halftone images on recording media may be increased accordingly.

When a cross section of the first toner particle is observed, at least two crystalline resin domains (preferably, at least three crystalline resin domains) satisfy the conditions (A), (B1), (C), and (D).

The proportion of the first toner particles to the entire toner particles is preferably 40% or more by number, is more preferably 70% or more by number, is further preferably 80% or more by number, and is particularly preferably 90% or more by number in order to increase the degree of fixation of halftone images on recording media. The proportion of the first toner particles to the entire toner particles is ideally 100% by number.

When a cross section of the second toner particle is observed, at least two crystalline resin domains (preferably, at least three crystalline resin domains) satisfy the conditions (A), (B2), (C), and (D).

The proportion of the second toner particles to the entire toner particles is preferably 40% or more by number, is more preferably 70% or more by number, is further preferably 80% or more by number, and is particularly preferably 90% or more by number in order to increase the degree of fixation of halftone images on recording media. The proportion of the second toner particles to the entire toner particles is ideally 100% by number.

Each of the conditions (A), (B1), (B2), (C), and (D) has a preferable range.

Condition (A)

The aspect ratio of the crystalline resin domain is 5 or more and 40 or less and is preferably 10 or more and 40 or less in order to increase the degree of fixation of halftone images on recording media.

The aspect ratio of the crystalline resin domain is the ratio of the major axis length to the minor axis length of the crystalline resin domain (major axis length/minor axis length). The major axis length of the crystalline resin domain is the maximum length of the crystalline resin domain. The minor axis length of the crystalline resin domain is the maximum of the lengths of the crystalline resin domain measured in a direction orthogonal to the extension of the major axis of the crystalline resin domain.

Condition (B1)

The major axis length of the crystalline resin domain ($L_{Cry}$ in FIG. 3) is 0.5 μm or more and 1.5 μm or less and is preferably 0.8 μm or more and 1.5 μm or less in order to increase the degree of fixation of halftone images on recording media.

Condition (B2)

The ratio of the major axis length of the crystalline resin domain ($L_{Cry}$ in FIG. 3) to the maximum diameter of the toner particle ($L_T$ in FIG. 3) is 10% or more and 30% or less, is preferably 13% or more and 30% or less, and is more preferably 17% or more and 30% or less in order to increase the degree of fixation of halftone images on recording media.

The maximum diameter of a toner particle is the maximum length of a line segment that connects any two points on the circumference of the cross section of the toner particle (i.e., major axis length).

Condition (C)

The angle ($\theta_A$ in FIG. 3) formed by the extension of the major axis of the crystalline resin domain and a tangent to the surface of the toner particle (i.e., the outer periphery of the toner particle) at the point at which the extension intersects the surface of the toner particle is 60° or more and 90° or less and is preferably 75° or more and 90° or less in order to increase the degree of fixation of halftone images on recording media.

Condition (D)

The angle ($\theta_B$ in FIG. 3) at which extensions of the major axes of two crystalline resin domains intersect each other is 45° or more and 90° or less and is preferably 60° or more and 90° or less in order to increase the degree of fixation of halftone images on recording media.

Method for Observing Cross Section of Toner Particle

A toner particle (or a toner particle including an external additive adhered thereon) is mixed with an epoxy resin so as to be buried in the epoxy resin. The epoxy resin is then solidified. The resulting solid is cut with an ultramicrotome apparatus "Ultracut UCT" produced by Leica Biosystems into a thin specimen having a thickness of 80 nm or more and 130 nm or less. The thin specimen is stained with ruthenium tetroxide in a desiccator at 30° C. for 3 hours. A transmission image-mode STEM observation image (acceleration voltage: 30 kV, magnification: 20,000 times) of the stained thin specimen is captured with an ultra-high-resolution field-emission scanning electron microscope (FE-SEM) "S-4800" produced by Hitachi High-Tech Corporation. While the image contains cross sections of toner particles having various sizes, cross sections of specific toner particles having a diameter that is 85% or more of the volume average particle size of the toner particles are selected and used for the observation. The diameter of a cross section of a toner particle is the maximum length of a line segment that connects any two points on the circumference of the cross section of the toner particle (i.e., major axis length).

In the image, an amorphous resin, a crystalline resin, and a release agent are distinguished from one another on the basis of contrast and shape. By ruthenium staining, an amorphous resin (e.g., an amorphous polyester resin) is stained most intensely, a crystalline resin (e.g., a crystalline polyester resin) is stained second most intensely, and a release agent is stained most slightly. When the contrast of the image is adjusted appropriately, an amorphous resin appears as black, a crystalline resin appears as light gray, and a release agent appears as white.

An image analysis of the crystalline resin domains is conducted to determine whether the toner particles satisfy the conditions (A), (B1), (B2), (C), and (D). For determining the proportion of the first or second toner particles, 100 toner particles are observed and the proportion of the number of the first or second toner particles is calculated.

The first and second toner particles may satisfy the condition (E) below in order to increase the degree of fixation of halftone images on recording media.

Condition (E): when a cross section of a toner particle is observed, a domain composed of the release agent is present at a position 50 nm or more below the surface of the toner particle. That is, when a cross section of a toner particle is observed, the shortest distance between a release agent domain present in the toner particle and the surface (i.e., the outer periphery) of the toner particle is 50 nm or more.

The condition (E) means that the release agent domains are not exposed at the surfaces of the toner particles. If the release agent domains are exposed at the surfaces of the toner particles, the external additive may be unevenly distributed at the portions at which the release agent is exposed. In contrast, when the release agent domains are present at a position 50 nm or more below the surface of each toner particle, the external additive may adhere onto the surfaces of the toner particles in a substantially uniform manner and, consequently, inconsistencies in the manner in which the toner particles are melted during the fixation may be reduced. As a result, the degree of fixation of halftone images on recording media may be increased.

Whether the condition (E) is satisfied is determined by the above-described method for observing a cross section of a toner particle.

The proportion of the first toner particles that satisfy the condition (E) to the entire toner particles is preferably 40% or more by number, is more preferably 70% or more by number, is further preferably 80% or more by number, and is particularly preferably 90% or more by number in order to increase the degree of fixation of halftone images on recording media. The above proportion is ideally 100% by number.

The proportion of the second toner particles that satisfy the condition (E) to the entire toner particles is preferably 40% or more by number, is more preferably 70% or more by number, is further preferably 80% or more by number, and is particularly preferably 90% or more by number in order to increase the degree of fixation of halftone images on recording media. The above proportion is ideally 100% by number.

External Additive

Examples of the external additive include inorganic particles. Examples of the inorganic particles include $SiO_2$ particles, $TiO_2$ particles, $Al_2O_3$ particles, CuO particles, ZnO particles, $SnO_2$ particles, $CeO_2$ particles, $Fe_2O_3$ particles, MgO particles, BaO particles, CaO particles, $K_2O$ particles, $Na_2O$ particles, $ZrO_2$ particles, $CaO \cdot SiO_2$ particles, $K_2O \cdot (TiO_2)_n$ particles, $Al_2O_3 \cdot 2SiO_2$ particles, $CaCO_3$ particles, $MgCO_3$ particles, $BaSO_4$ particles, and $MgSO_4$ particles.

The surfaces of the inorganic particles used as an external additive may be subjected to a hydrophobic treatment. The hydrophobic treatment is performed by, for example, immersing the inorganic particles in a hydrophobizing agent. Examples of the hydrophobizing agent include, but are not limited to, a silane coupling agent, a silicone oil, a titanate coupling agent, and aluminum coupling agent. These hydrophobizing agents may be used alone or in combination of two or more. The amount of the hydrophobizing agent is commonly, for example, 1 part by mass or more and 10 parts by mass or less relative to 100 parts by mass of the inorganic particles.

Examples of the external additive further include particles of a resin, such as polystyrene, polymethyl methacrylate, or a melamine resin; and particles of a cleaning lubricant, such as a metal salt of a higher fatty acid, such as zinc stearate, or a fluorine-contained resin.

The amount of the external additive used is preferably 0.01% by mass or more and 5% by mass or less and is more preferably 0.01% by mass or more and 2.0% by mass or less of the amount of the toner particles.

Method for Producing Toner

The toner according to the exemplary embodiment is produced by, after the preparation of the toner particles, depositing an external additive on the surfaces of the toner particles.

The toner particles may be prepared by any dry process, such as knead pulverization, or any wet process, such as aggregation coalescence, suspension polymerization, or dissolution suspension. However, a method for preparing the toner particles is not limited thereto, and any suitable method known in the related art may be used. Among these methods, aggregation coalescence may be used in order to prepare the toner particles.

Specifically, in the case where aggregation coalescence is used in order to prepare the toner particles, the toner particles are prepared by the following steps:

preparing an amorphous resin particle dispersion liquid in which amorphous resin particles are dispersed and a crystalline resin particle dispersion liquid in which crystalline resin particles are dispersed (i.e., resin particle dispersion liquid preparation step);

causing the amorphous resin particles (and, as needed, other particles) to aggregate together in the amorphous resin particle dispersion liquid (or in the amorphous resin particle dispersion liquid mixed with another particle dispersion liquid as needed) in order to form first aggregated particles (i.e., first aggregated particle formation step);

repeatedly conducting the operation of mixing an aggregated particle dispersion liquid containing the first aggregated particles dispersed therein with the amorphous resin particle dispersion liquid and the crystalline resin particle dispersion liquid (or, mixing an aggregated particle dispersion liquid containing the first aggregated particles dispersed therein with a liquid mixture of the amorphous resin particle dispersion liquid and the crystalline resin particle dispersion liquid) to cause aggregation such that the amorphous resin particles and the crystalline resin particles are further adhered onto the surfaces of the first aggregated particles two or more times in order to form second aggregated particles (i.e., second aggregated particle formation step);

mixing the resulting aggregated particle dispersion liquid containing the second aggregated particles dispersed therein with the amorphous resin particle dispersion liquid to cause aggregation such that the amorphous resin particles are adhered onto the surfaces of the second aggregated particles in order to form third aggregated particles (i.e., third aggregated particle formation step); and heating the resulting aggregated particle dispersion liquid in which the third aggregated particles are dispersed in order to cause fusion and coalescence of the aggregated particles and thereby form toner particles (fusion-coalescence step).

Each of the above steps is described below in detail. Hereinafter, a method for preparing toner particles including a colorant and a release agent is described. However, it should be noted that the colorant and the release agent are optional. It is needless to say that additives other than a colorant and a release agent may be used.

Resin Particle Dispersion Liquid Preparation Step

An amorphous resin particle dispersion liquid containing the amorphous resin particles dispersed therein and a crystalline resin particle dispersion liquid containing the crystalline resin particles dispersed therein are prepared.

The resin particle dispersion liquid is prepared by, for example, dispersing resin particles in a dispersion medium using a surfactant.

Examples of the dispersion medium used for preparing the resin particle dispersion liquid include aqueous media. Examples of the aqueous media include water, such as distilled water and ion-exchange water; and alcohols. These aqueous media may be used alone or in combination of two or more.

Examples of the surfactant include anionic surfactants, such as sulfate surfactants, sulfonate surfactants, and phosphate surfactants; cationic surfactants, such as amine salt surfactants and quaternary ammonium salt surfactants; and nonionic surfactants, such as polyethylene glycol surfactants, alkylphenol ethylene oxide adduct surfactants, and polyhydric alcohol surfactants. Among these surfactants, in particular, the anionic surfactants and the cationic surfactants may be used. The nonionic surfactants may be used in combination with the anionic surfactants and the cationic surfactants. These surfactants may be used alone or in combination of two or more.

In the preparation of the resin particle dispersion liquid, the resin particles can be dispersed in a dispersion medium by any suitable dispersion method commonly used in the related art in which, for example, a rotary-shearing homogenizer, a ball mill, a sand mill, or a dyno mill that includes media is used. Depending on the type of the resin particles used, the resin particles may be dispersed in the dispersion medium by, for example, phase-inversion emulsification. Phase-inversion emulsification is a method in which the resin to be dispersed is dissolved in a hydrophobic organic solvent in which the resin is soluble, a base is added to the resulting organic continuous phase (i.e., O phase) to perform neutralization, and subsequently an aqueous medium (i.e., W phase) is charged in order to perform phase inversion from W/O to O/W and disperse the resin in the aqueous medium in the form of particles.

The volume average diameter of the resin particles dispersed in the resin particle dispersion liquid is preferably, for example, 0.01 µm or more and 1 µm or less, is more preferably 0.08 µm or more and 0.8 µm or less, and is further preferably 0.1 µm or more and 0.6 µm or less.

The volume average diameter of the resin particles is determined in the following manner. The particle diameter distribution of the resin particles is obtained using a laser-diffraction particle-size-distribution measurement apparatus, such as "LA-700" produced by HORIBA, Ltd. The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 50% is considered to be the volume particle diameter D50v. The volume average diameters of particles included in the other dispersion liquids are also determined in the above-described manner.

The content of the resin particles included in the resin particle dispersion liquid is preferably 5% by mass or more and 50% by mass or less and is more preferably 10% by mass or more and 40% by mass or less.

The colorant particle dispersion liquid, the release agent particle dispersion liquid, and the like are also prepared as in the preparation of the resin particle dispersion liquid. In other words, the above-described specifications for the volume average diameter of the particles included in the resin particle dispersion liquid, the dispersion medium of the resin particle dispersion liquid, the dispersion method used for preparing the resin particle dispersion liquid, and the content of the particles in the resin particle dispersion liquid can also be applied to colorant particles dispersed in the colorant particle dispersion liquid and release agent particles dispersed in the release agent particle dispersion liquid.

First Aggregated Particle Formation Step

The amorphous resin particle dispersion liquid is mixed with the colorant particle dispersion liquid and the release agent particle dispersion liquid. In the resulting mixed dispersion liquid, heteroaggregation of the amorphous resin particles with the colorant particles and the release agent particles is performed in order to form first aggregated particles including the amorphous resin particles, the colorant particles, and the release agent particles, the first aggregated particles having a diameter close to that of the desired toner particles.

Specifically, for example, a flocculant is added to the mixed dispersion liquid, and the pH of the mixed dispersion liquid is controlled to be acidic (e.g., pH of 2 or more and 5 or less). A dispersion stabilizer may be added to the mixed dispersion liquid as needed. Subsequently, the mixed dispersion liquid is heated to a temperature close to the glass transition temperature of the resin particles (specifically, e.g., [glass transition temperature of the resin particles −30° C.] or more and [the glass transition temperature −10° C.] or less), and thereby the particles dispersed in the mixed dispersion liquid are caused to aggregate together to form first aggregated particles.

In the first aggregated particle formation step, alternatively, for example, the above flocculant may be added to the mixed dispersion liquid at room temperature (e.g., 25° C.) while the mixed dispersion liquid is stirred using a rotary-shearing homogenizer. Then, the pH of the mixed dispersion liquid is controlled to be acidic (e.g., pH of 2 or more and 5 or less), and a dispersion stabilizer may be added to the mixed dispersion liquid as needed. Subsequently, the mixed dispersion liquid is heated in the above-described manner.

Examples of the flocculant include surfactants, inorganic metal salts, and divalent or higher metal complexes that have a polarity opposite to that of the surfactant included in the mixed dispersion liquid. Using a metal complex as a flocculant reduces the amount of surfactant used and, as a result, charging characteristics may be enhanced.

An additive capable of forming a complex or a bond similar to a complex with the metal ions contained in the flocculant may optionally be used in combination with the flocculant. An example of the additive is a chelating agent.

Examples of the inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelating agent may be a water-soluble chelating agent. Examples of such a chelating agent include oxycarboxylic acids, such as tartaric acid, citric acid, and gluconic acid; and aminocarboxylic acids, such as iminodiacetic acid (IDA), nitrilotriacetic acid (NTA), and ethylenediaminetetraacetic acid (EDTA).

The amount of the chelating agent used is preferably 0.01 parts by mass or more and 5.0 parts by mass or less and is more preferably 0.1 parts by mass or more and less than 3.0 parts by mass relative to 100 parts by mass of the resin particles.

Second Aggregated Particle Formation Step

The resulting aggregated particle dispersion liquid containing the first aggregated particles dispersed therein is mixed with the amorphous resin particle dispersion liquid and the crystalline resin particle dispersion liquid. Alternatively, the aggregated particle dispersion liquid containing the first aggregated particles dispersed therein may be mixed with a liquid mixture of the amorphous resin particle dispersion liquid and the crystalline resin particle dispersion liquid. Subsequently, in a dispersion liquid containing the first aggregated particles, the amorphous resin particles, and the crystalline resin particles dispersed therein, aggregation is performed such that the amorphous resin particles and the crystalline resin particles are adhered onto the surfaces of the first aggregated particles.

Specifically, for example, when the size of the first aggregated particles reaches the intended particle size in the first aggregated particle formation step, the amorphous resin particle dispersion liquid and the crystalline resin particle dispersion liquid are added to the above dispersion liquid and heating is subsequently performed at a temperature equal to or less than the glass transition temperature of the amorphous resin particles. The above aggregation operation is repeated two or more times to form the second aggregated particles.

A chloride, such as ammonium chloride, may be added to the dispersion liquid in the second aggregated particle formation step in order to add Cl ions to the surface layers of the toner particles.

Third Aggregated Particle Formation Step

The resulting aggregated particle dispersion liquid containing the second aggregated particles dispersed therein is mixed with the amorphous resin particle dispersion liquid to perform aggregation in a dispersion liquid containing the second aggregated particles and the amorphous resin particles dispersed therein such that the amorphous resin particles are adhered onto the surfaces of the second aggregated particles.

Specifically, for example, when the size of the second aggregated particles reaches the intended particle size in the second aggregated particle formation step, the amorphous resin particle dispersion liquid is added to the above dispersion liquid and heating is subsequently performed at a temperature equal to or less than the glass transition temperature of the amorphous resin particles. Then, the progress of the aggregation is stopped by adjusting the pH of the dispersion liquid.

A chloride, such as ammonium chloride, may be added to the dispersion liquid in the third aggregated particle formation step in order to add Cl ions to the surface layers of the toner particles.

Fusion-Coalescence Step

The aggregated particle dispersion liquid in which the third aggregated particles are dispersed is heated to, for example, a temperature equal to or higher than the glass transition temperature of the amorphous resin particles (e.g., to a temperature higher than the glass transition temperature of the amorphous resin particles by 10° C. to 30° C.) in order to perform fusion and coalescence of the aggregated particles. Hereby, toner particles are prepared.

Subsequent to the heating performed for fusion and coalescence, for example, cooling may be performed to 30° C. at a cooling rate of 5° C./min or more and 40° C./min or less. Performing rapid cooling in the above-described manner increases the likelihood of the contraction of the surfaces of the toner particles. This may increase the formation of cracks that extend from the inside of each toner particle toward the surface.

Subsequently, reheating is performed at 0.1° C./min or more and 2° C./min or less, and holding is performed at a temperature equal to or higher than the melting temperature of the crystalline resin minus 5° C. for 10 minutes or more. Then, slow cooling is performed at 0.1° C./min or more and 1° C./min or less in order to cause crystalline resin domains to glow in the directions of the cracks, that is, to cause crystalline resin domains to glow in the direction from the inside of each toner particle toward the surface, such that the crystalline resin domains satisfy the above-described conditions.

For example, when the temperature is increased to be equal to or higher than the melting temperature of the release agent during reheating, the possibility of the release agent domains glowing to reach the vicinity of the surface of each toner particle may be increased. Therefore, the temperature at which heating is performed subsequent to reheating may be equal to or higher than the melting temperature of the crystalline resin minus 5° C. and equal to or less than the melting temperature of the release agent.

After the completion of the fusion-coalescence step, the toner particles formed in the solution are subjected to any suitable cleaning step, solid-liquid separation step, and drying step that are known in the related art in order to obtain dried toner particles. In the cleaning step, the toner particles may be subjected to displacement washing using ion-exchange water to a sufficient degree from the viewpoint of electrification characteristics. Examples of a solid-liquid separation method used in the solid-liquid separation step include suction filtration and pressure filtration from the viewpoint of productivity. Examples of a drying method used in the drying step include freeze-drying, flash drying, fluidized drying, and vibrating fluidized drying from the viewpoint of productivity.

The toner according to the exemplary embodiment is produced by, for example, adding an external additive to the dried toner particles and mixing the resulting toner particles using a V-blender, a HENSCHEL mixer, a Lodige mixer, or the like. Optionally, coarse toner particles may be removed using a vibrating screen classifier, a wind screen classifier, or the like.

Electrostatic Image Developer

An electrostatic image developer according to the exemplary embodiment includes at least the toner according to the exemplary embodiment. The electrostatic image developer according to the exemplary embodiment may be a single component developer including only the toner according to the exemplary embodiment or may be a two-component developer that is a mixture of the toner and a carrier.

The type of the carrier is not limited, and any suitable carrier known in the related art may be used. Examples of the carrier include a coated carrier prepared by coating the surfaces of cores including magnetic powder particles with a resin; a magnetic-powder-dispersed carrier prepared by dispersing and mixing magnetic powder particles in a matrix resin; and a resin-impregnated carrier prepared by impregnating a porous magnetic powder with a resin. The magnetic-powder-dispersed carrier and the resin-impregnated carrier may also be prepared by coating the surfaces of particles constituting the carrier, that is, core particles, with a resin.

Examples of the magnetic powder include powders of magnetic metals, such as iron, nickel, and cobalt; and powders of magnetic oxides, such as ferrite and magnetite.

Examples of the coat resin and the matrix resin include polyethylene, polypropylene, polystyrene, poly(vinyl acetate), poly(vinyl alcohol), poly(vinyl butyral), poly(vinyl chloride), poly(vinyl ether), poly(vinyl ketone), a vinyl chloride-vinyl acetate copolymer, a styrene-acrylic acid ester copolymer, a straight silicone resin including an organosiloxane bond and the modified products thereof, a fluorine resin, polyester, polycarbonate, a phenolic resin, and an epoxy resin. The coat resin and the matrix resin may optionally include additives, such as conductive particles. Examples of the conductive particles include particles of metals, such as gold, silver, and copper; and particles of carbon black, titanium oxide, zinc oxide, tin oxide, barium sulfate, aluminum borate, and potassium titanate.

The surfaces of the cores can be coated with a resin by, for example, using a coating-layer forming solution prepared by dissolving the coat resin and, as needed, various types of additives in a suitable solvent. The type of the solvent is not limited and may be selected with consideration of the type of the resin used, ease of applying the coating-layer forming solution, and the like.

Specific examples of a method for coating the surfaces of the cores with the coat resin include an immersion method in which the cores are immersed in the coating-layer forming solution; a spray method in which the coating-layer forming solution is sprayed onto the surfaces of the cores; a fluidized-bed method in which the coating-layer forming solution is sprayed onto the surfaces of the cores while the cores are floated using flowing air; and a kneader-coater method in which the cores of the carrier are mixed with the coating-layer forming solution in a kneader coater and subsequently the solvent is removed.

The mixing ratio (i.e., mass ratio) of the toner to the carrier in the two-component developer is preferably toner: carrier=1:100 to 30:100 and is more preferably 3:100 to 20:100.

Image Forming Apparatus and Image Forming Method

An image forming apparatus and an image forming method according to the exemplary embodiment are described below.

The image forming apparatus according to the exemplary embodiment includes an image holding member; a charging unit that charges the surface of the image holding member; an electrostatic image formation unit that forms an electrostatic image on the charged surface of the image holding member; a developing unit that includes an electrostatic image developer and develops the electrostatic image formed on the surface of the image holding member with the electrostatic image developer to form a toner image; a transfer unit that transfers the toner image formed on the surface of the image holding member onto the surface of a recording medium; and a fixing unit that fixes the toner image onto the surface of the recording medium. The electrostatic image developer is the electrostatic image developer according to the exemplary embodiment.

The image forming apparatus according to the exemplary embodiment uses an image forming method (image forming method according to the exemplary embodiment) including charging the surface of the image holding member; forming an electrostatic image on the charged surface of the image holding member; developing the electrostatic image formed on the surface of the image holding member with the electrostatic image developer according to the exemplary embodiment to form a toner image; transferring the toner image formed on the surface of the image holding member onto the surface of a recording medium; and fixing the toner image onto the surface of the recording medium.

The image forming apparatus according to the exemplary embodiment may be any image forming apparatus known in the related art, such as a direct-transfer image forming apparatus in which a toner image formed on the surface of an image holding member is directly transferred to a recording medium; an intermediate-transfer image forming apparatus in which a toner image formed on the surface of an image holding member is transferred onto the surface of an intermediate transfer body in the first transfer step and the toner image transferred on the surface of the intermediate transfer body is transferred onto the surface of a recording medium in the second transfer step; an image forming apparatus including a cleaning unit that cleans the surface of the image holding member subsequent to the transfer of the toner image before the image holding member is again charged; and an image forming apparatus including a static-erasing unit that erases static by irradiating the surface of an image holding member with static-erasing light subsequent to the transfer of the toner image before the image holding member is again charged.

In the case where the image forming apparatus according to the exemplary embodiment is the intermediate-transfer image forming apparatus, the transfer unit may be constituted by, for example, an intermediate transfer body to which a toner image is transferred, a first transfer subunit that transfers a toner image formed on the surface of the image holding member onto the surface of the intermediate transfer body in the first transfer step, and a second transfer subunit that transfers the toner image transferred on the surface of the intermediate transfer body onto the surface of a recording medium in the second transfer step.

In the image forming apparatus according to the exemplary embodiment, for example, a portion including the developing unit may have a cartridge structure (i.e., process cartridge) detachably attachable to the image forming apparatus. An example of the process cartridge is a process cartridge including the electrostatic image developer according to the exemplary embodiment and the developing unit.

An example of the image forming apparatus according to the exemplary embodiment is described below, but the image forming apparatus is not limited thereto. Hereinafter, only components illustrated in drawings are described; others are omitted.

FIG. 1 schematically illustrates the image forming apparatus according to the exemplary embodiment.

The image forming apparatus illustrated in FIG. 1 includes first to fourth electrophotographic image formation units 10Y, 10M, 10C, and 10K that form yellow (Y), magenta (M), cyan (C), and black (K) images, respectively, on the basis of color separation image data. The image formation units (hereinafter, referred to simply as "units") 10Y, 10M, 10C, and 10K are horizontally arranged in parallel at a predetermined distance from one another. The units 10Y, 10M, 10C, and 10K may be process cartridges detachably attachable to the image forming apparatus.

An intermediate transfer belt (example of the intermediate transfer body) 20 runs above and extends over the units 10Y, 10M, 10C, and 10K. The intermediate transfer belt 20 is wound around a drive roller 22 and a support roller 24 and runs clockwise in FIG. 1, that is, in the direction from the first unit 10Y to the fourth unit 10K. Using a spring or the like (not illustrated), a force is applied to the support roller 24 in a direction away from the drive roller 22, thereby applying tension to the intermediate transfer belt 20 wound around the drive roller 22 and the support roller 24. An intermediate transfer body-cleaning device 30 is disposed so as to contact with the image-carrier-side surface of the intermediate transfer belt 20 and to face the drive roller 22.

Developing devices (examples of the developing units) 4Y, 4M, 4C, and 4K of the units 10Y, 10M, 10C, and 10K are supplied with yellow, magenta, cyan, and black toners stored in toner cartridges 8Y, 8M, 8C, and 8K, respectively.

Since the first to fourth units 10Y, 10M, 10C, and 10K have the same structure and the same action, the following description is made with reference to, as a representative, the first unit 10Y that forms an yellow image and is located upstream in a direction in which the intermediate transfer belt runs.

The first unit 10Y includes a photosensitive member 1Y serving as an image holding member. The following components are disposed around the photosensitive member 1Y sequentially in the counterclockwise direction: a charging roller (example of the charging unit) 2Y that charges the surface of the photosensitive member 1Y at a predetermined potential; an exposure device (example of the electrostatic image formation unit) 3 that forms an electrostatic image by irradiating the charged surface of the photosensitive member 1Y with a laser beam 3Y based on a color separated image signal; a developing device (example of the developing unit) 4Y that develops the electrostatic image by supplying a charged toner to the electrostatic image; a first transfer roller (example of the first transfer subunit) 5Y that transfers the developed toner image to the intermediate transfer belt 20; and a photosensitive-member cleaning device (example of the cleaning unit) 6Y that removes a toner remaining on the surface of the photosensitive member 1Y after the first transfer.

The first transfer roller 5Y is disposed so as to contact with the inner surface of the intermediate transfer belt 20 and to face the photosensitive member 1Y. Each of the first transfer rollers 5Y, 5M, 5C, and 5K of the respective units is connected to a bias power supply (not illustrated) that applies a first transfer bias to the first transfer rollers. Each bias power supply varies the transfer bias applied to the corresponding first transfer roller on the basis of the control by a controller (not illustrated).

The action of forming a yellow image in the first unit 10Y is described below.

Before the action starts, the surface of the photosensitive member 1Y is charged at a potential of −600 to −800 V by the charging roller 2Y.

The photosensitive member 1Y is formed by stacking a photosensitive layer on a conductive substrate (e.g., volume resistivity at 20° C.: $1\times10^{-6}$ Ωcm or less). The photosensitive layer is normally of high resistance (comparable with the resistance of ordinary resins), but, upon being irradiated with the laser beam, the specific resistance of the portion irradiated with the laser beam varies. Thus, the exposure device 3 irradiates the surface of the charged photosensitive member 1Y with the laser beam 3Y on the basis of the image data of the yellow image sent from the controller (not illustrated). As a result, an electrostatic image of yellow image pattern is formed on the surface of the photosensitive member 1Y.

The term "electrostatic image" used herein refers to an image formed on the surface of the photosensitive member 1Y by charging, the image being a "negative latent image" formed by irradiating a portion of the photosensitive layer with the laser beam 3Y to reduce the specific resistance of the irradiated portion such that the charges on the irradiated surface of the photosensitive member 1Y discharge while the charges on the portion that is not irradiated with the laser beam 3Y remain.

The electrostatic image, which is formed on the photosensitive member 1Y as described above, is sent to the predetermined developing position by the rotating photosensitive member 1Y. The electrostatic image on the photosensitive member 1Y is developed and visualized in the form of a toner image by the developing device 4Y at the developing position.

The developing device 4Y includes an electrostatic image developer including, for example, at least, a yellow toner and a carrier. The yellow toner is stirred in the developing device 4Y to be charged by friction and supported on a developer roller (example of the developer support), carrying an electric charge of the same polarity (i.e., negative) as the electric charge generated on the photosensitive member 1Y. The yellow toner is electrostatically adhered to the erased latent image portion on the surface of the photosensitive member 1Y as the surface of the photosensitive member 1Y passes through the developing device 4Y. Thus, the latent image is developed using the yellow toner. The photosensitive member 1Y on which the yellow toner image is formed keeps rotating at the predetermined rate, thereby transporting the toner image developed on the photosensitive member 1Y to the predetermined first transfer position.

Upon the yellow toner image on the photosensitive member 1Y reaching the first transfer position, first transfer bias is applied to the first transfer roller 5Y so as to generate an electrostatic force on the toner image in the direction from the photosensitive member 1Y toward the first transfer roller 5Y. Thus, the toner image on the photosensitive member 1Y is transferred to the intermediate transfer belt 20. The transfer bias applied has the opposite polarity (+) to that of the toner (−) and controlled to be, in the first unit 10Y, for example, +10 µA by a controller (not illustrated).

The toner particles remaining on the photosensitive member 1Y are removed by the photosensitive-member cleaning device 6Y and then collected.

Each of the first transfer biases applied to first transfer rollers 5M, 5C, and 5K of the second, third, and fourth units 10M, 10C, and 10K is controlled in accordance with the first unit 10Y.

Thus, the intermediate transfer belt 20, on which the yellow toner image is transferred in the first unit 10Y, is successively transported through the second to fourth units 10M, 10C, and 10K while toner images of the respective colors are stacked on top of another.

The resulting intermediate transfer belt 20 on which toner images of four colors are multiple-transferred in the first to fourth units is then transported to a second transfer section including a support roller 24 contacting with the inner surface of the intermediate transfer belt 20 and a second transfer roller (example of the second transfer subunit) 26 disposed on the image-carrier-side of the intermediate transfer belt 20. A recording paper (example of the recording medium) P is fed by a feed mechanism into a narrow space between the second transfer roller 26 and the intermediate transfer belt 20 that contact with each other at the predetermined timing. The second transfer bias is then applied to the support roller 24. The transfer bias applied here has the same polarity (−) as that of the toner (−) and generates an electrostatic force on the toner image in the direction from the intermediate transfer belt 20 toward the recording paper P. Thus, the toner image on the intermediate transfer belt 20 is transferred to the recording paper P. The intensity of the second transfer bias applied is determined on the basis of the resistance of the second transfer section which is detected by a resistance detector (not illustrated) that detects the resistance of the second transfer section and controlled by changing voltage.

Subsequently, the recording paper P is transported into a nip part of the fixing device (example of the fixing unit) 28 at which a pair of fixing rollers contact with each other. The toner image is fixed to the recording paper P to form a fixed image.

Examples of the recording paper P to which a toner image is transferred include plain paper used in electrophotographic copiers, printers, and the like. Instead of the recording paper P, OHP films and the like may be used as a recording medium.

The surface of the recording paper P may be smooth in order to enhance the smoothness of the surface of the fixed image. Examples of such a recording paper include coated paper produced by coating the surface of plain paper with resin or the like and art paper for printing.

The recording paper P, to which the color image has been fixed, is transported toward an exit portion. Thus, the series of the steps for forming a color image are terminated.

Process Cartridge

A process cartridge according to the exemplary embodiment is described below.

The process cartridge according to the exemplary embodiment includes a developing unit that includes the electrostatic image developer according to the exemplary embodiment and develops an electrostatic image formed on the surface of an image holding member with the electrostatic image developer to form a toner image. The process cartridge according to the exemplary embodiment is detachably attachable to an image forming apparatus.

The structure of the process cartridge according to the exemplary embodiment is not limited to the above-described one. The process cartridge according to the exemplary embodiment may further include, in addition to the developing unit, at least one unit selected from an image holding member, a charging unit, an electrostatic image formation unit, a transfer unit, etc.

An example of the process cartridge according to the exemplary embodiment is described below, but the process cartridge is not limited thereto. Hereinafter, only components illustrated in FIG. 2 are described; others are omitted.

Figure 2:
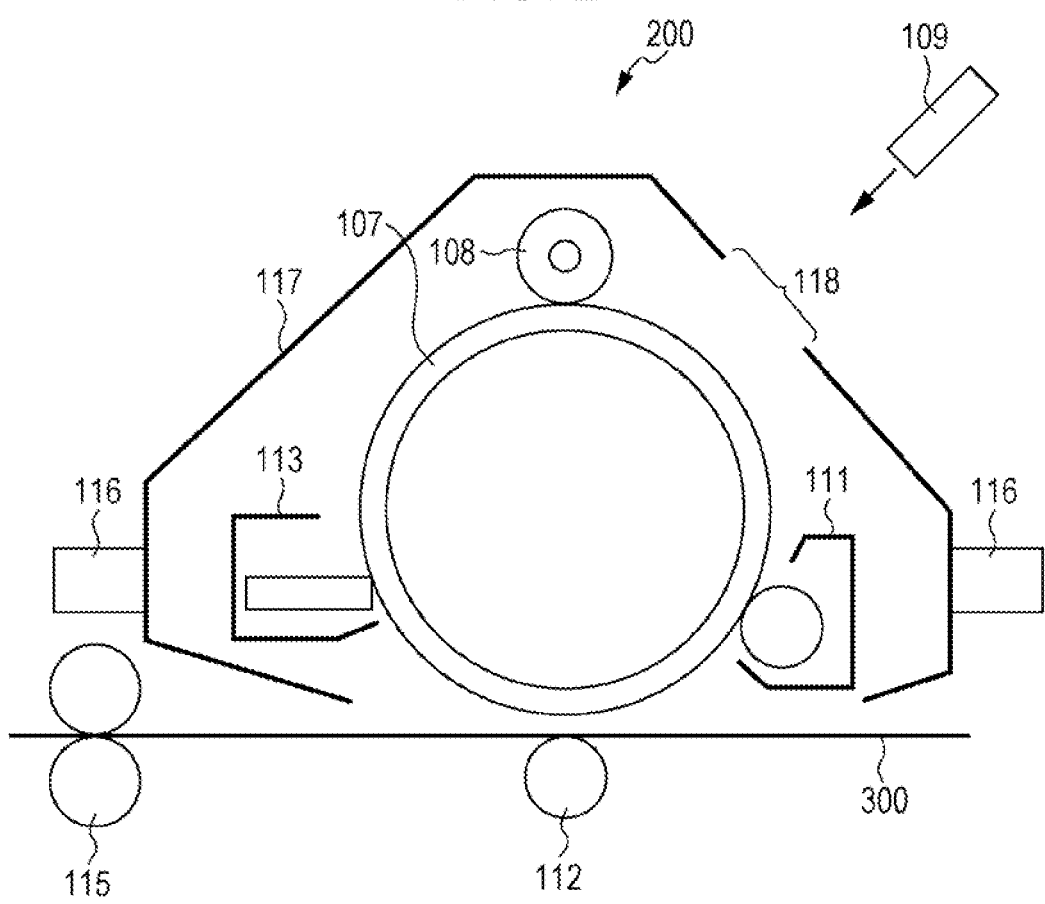
FIG. 2 is a schematic diagram illustrating an example of a process cartridge according to an exemplary embodiment which is detachably attachable to an image forming apparatus.

FIG. 2 schematically illustrates the process cartridge according to the exemplary embodiment.

A process cartridge 200 illustrated in FIG. 2 includes, for example, a photosensitive member 107 (example of the image holding member), a charging roller 108 (example of the charging unit) disposed on the periphery of the photosensitive member 107, a developing device 111 (example of the developing unit), and a photosensitive-member cleaning device 113 (example of the cleaning unit), which are combined into one unit using a housing 117 to form a cartridge. The housing 117 has an aperture 118 for exposure. A mounting rail 116 is disposed on the housing 117.

In FIG. 2, Reference numeral 109 denotes an exposure device (example of the electrostatic image formation unit), Reference numeral 112 denotes a transfer device (example of the transfer unit), Reference numeral 115 denotes a fixing device (example of the fixing unit), and the Reference numeral 300 denotes recording paper (example of the recording medium).

EXAMPLES

Details of the exemplary embodiment of the present disclosure are described below with reference to Examples below. The exemplary embodiment of the present disclosure is not limited to Examples below. Hereinafter, the terms "part" and "%" are on a mass basis unless otherwise specified.

Preparation of Amorphous Polyester Resin Particle Dispersion Liquid (A1)

Terephthalic acid: 70 parts
Fumaric acid: 30 parts
Ethylene glycol: 41 parts
1,5-Pentanediol: 48 parts The above materials are charged into a flask equipped with a stirring apparatus, a nitrogen introduction tube, a temperature sensor, and a fractionating column. Subsequently, the temperature is increased to 220° C. over 1 hour under a stream of nitrogen gas. Then, 1 part of titanium tetraethoxide is added to the flask relative to 100 parts of the total amount of the above materials. While the product water is removed by distillation, the temperature is then increased to 240° C. over 0.5 hours and a dehydration condensation reaction is continued for 1 hour at 240° C. Subsequently, the product of the reaction is cooled. Hereby, an amorphous polyester resin having a weight average molecular weight of 96,000 and a glass transition temperature of 61° C. is prepared.

Into a container equipped with a temperature control device and a nitrogen purging device, 40 parts of ethyl acetate and 25 parts of 2-butanol are charged. After the resulting mixture has been formed into a mixed solvent, 100 parts of the amorphous polyester resin is gradually charged into the container to form a solution. To the solution, a 10% aqueous ammonia solution is added in an amount equivalent to an amount three times the acid value of the resin in terms of molar ratio. The resulting liquid mixture is stirred for 30 minutes. Subsequently, the inside of the container is purged with a dry nitrogen gas. While the temperature is maintained to be 40° C. and the liquid mixture is stirred, 400 parts of ion-exchange water is added dropwise to the container to perform emulsification. After the addition of the ion-exchange water has been terminated, the resulting emulsion liquid is cooled to 25° C. Hereby, a resin particle dispersion liquid containing resin particles having a volume average particle size of 190 nm is prepared. The solid content in the resin particle dispersion liquid is adjusted to be 20% by the addition of ion-exchange water. Hereby, an amorphous polyester resin particle dispersion liquid (A1) is prepared.

Preparation of Crystalline Polyester Resin Particle Dispersion Liquid (B1)

1,10-Decanedicarboxylic acid: 265 parts
1,6-Hexanediol: 168 parts
Dibutyltin oxide (catalyst): 0.3 parts The above materials are charged into a three-necked flask dried by heating. The air inside the three-necked flask is replaced with a nitrogen gas to create an inert atmosphere. Then, stirring and reflux are performed at 180° C. for 5 hours by mechanical stirring. Subsequently, the temperature is gradually increased to 230° C. under reduced pressure. Then, stirring is performed for 2 hours. After the viscosity has been increased to a sufficiently high level, air cooling is performed to stop the reaction. Hereby, a crystalline polyester resin having a weight average molecular weight of 12,700 and a melting temperature of 73° C. is prepared.

With 90 parts of the crystalline polyester resin, 1.8 parts of an anionic surfactant "TaycaPower" produced by TAYCA CORPORATION and 210 parts of ion-exchange water are mixed. After the resulting mixture has been heated to 120° C., it is dispersed with a homogenizer "ULTRA-TURRAX T50" produced by IKA. Subsequently, a dispersion treatment is performed for 1 hour with a pressure-discharge Gaulin homogenizer. Hereby, a resin particle dispersion liquid containing resin particles having a volume average particle size of 190 nm is prepared. The solid content in the resin particle dispersion liquid is adjusted to be 20% by the addition of ion-exchange water. Hereby, a crystalline polyester resin particle dispersion liquid (B1) is prepared.

Preparation of Styrene Acrylic Resin Particle Dispersion Liquid (C1)

Styrene: 370 parts
n-Butyl acrylate: 30 parts
Acrylic acid: 2 parts
Dodecanethiol: 24 parts
Carbon tetrabromide: 4 parts A mixture prepared by mixing the above materials with one another to form a solution is dispersed in a surfactant solution prepared by dissolving 6 parts of a non-ionic surfactant "Nonipol 400" produced by Sanyo Chemical Industries, Ltd. and 10 parts of an anionic surfactant "TaycaPower" produced by TAYCA CORPORATION in 550 parts of ion-exchange water and emulsification is performed in a flask. Subsequently, while the contents of the flask are stirred, an aqueous solution prepared by dissolving 4 parts of ammonium persulfate in 50 parts of ion-exchange water is charged into the flask over 20 minutes. After nitrogen purging has been performed, the temperature is increased with an oil bath until the temperature of the contents reaches 70° C. while the contents of the flask are stirred. The temperature is kept at 70° C. for 5 hours in order to continue the emulsion polymerization. Hereby, a resin particle dispersion liquid containing resin particles having a volume average particle size of 140 nm is prepared. The solid content in the resin particle dispersion liquid is adjusted to be 20% by the addition of ion-exchange water. Hereby, a styrene acrylic resin particle dispersion liquid (C1) is prepared.

Preparation of Release Agent Particle Dispersion Liquid (W1)

Ester wax "WEP-8" produced by NOF CORPORATION (melting temperature: 79° C.): 100 parts
Anionic surfactant "TaycaPower" produced by TAYCA CORPORATION: 1 part
Ion-exchange water: 350 parts The above materials are mixed with one another and heated to 100° C. The resulting mixture is dispersed with a homogenizer "ULTRA-TURRAX T50" produced by IKA and then further dispersed with a pressure-discharge Gaulin homogenizer. Hereby, a release agent particle dispersion liquid in which release agent particles having a volume average particle size of 220 nm are dispersed is prepared. Ion-exchange water is added to the release agent particle dispersion liquid in order to adjust the solid content in the dispersion liquid to be 20%. Hereby, a release agent particle dispersion liquid (W1) is prepared.

Preparation of Colorant Particle Dispersion Liquid (K1)

Carbon black "Regal330" produced by Cabot Corporation: 50 Parts
Anionic surfactant "TaycaPower" produced by TAYCA CORPORATION: 5 parts
Ion-exchange water: 193 parts The above materials are mixed with one another. The resulting mixture is dispersed at 240 MPa for 10 minutes with an Ultimizer produced by Sugino Machine Limited. Then, ion-exchange water is added to the resulting dispersion liquid to prepare a colorant particle dispersion liquid (K1) having a solid content of 20%.

Example 1

Preparation of Toner Particles

Ion-exchange water: 200 parts
Amorphous polyester resin particle dispersion liquid (A1): 130 parts
Styrene acrylic resin particle dispersion liquid (C1): 30 parts
Release agent particle dispersion liquid (W1): 10 parts
Colorant particle dispersion liquid (K1): 15 parts
Anionic surfactant "TaycaPower" produced by TAYCA CORPORATION: 2.8 parts The above materials are charged into a round-bottom flask made of stainless steel. After the pH has been adjusted to be 3.5 by addition of 0.1 N (0.1 mol/L) nitric acid, an aqueous solution prepared by dissolving 2.5 parts of aluminum sulfate in 30 parts of ion-exchange water is added to the flask. After dispersion has been performed with a homogenizer "ULTRA-TURRAX T50" produced by IKA at 30° C., the temperature is increased to 45° C. in a heating oil bath. Then, holding is performed until the volume average particle size reaches 4.5 μm.

Subsequently, 30 parts of the amorphous polyester resin particle dispersion liquid (A1) and 15 parts of the crystalline polyester resin particle dispersion liquid (B1) are added. Then, holding is performed for 30 minutes. The addition of the two components is conducted 4 times in total at intervals of 30 minutes.

Subsequently, 40 parts of the amorphous polyester resin particle dispersion liquid (A1) and 4 parts of an aqueous ammonium chloride solution prepared by dissolving 20 parts of ammonium chloride in 80 parts of ion-exchange water are added. The pH is adjusted to be 9.0 using a 1 N aqueous sodium hydroxide solution.

Subsequently, while stirring is continued, the temperature is increased to 85° C. at a heating rate of 0.05° C./min. After holding has been performed at 85° C. for 3 hours, the temperature is reduced to 30° C. at 15° C./min (i.e., first cooling). Then, the temperature is increased to 85° C. at a heating rate of 0.2° C./min (i.e., reheating). Subsequently, after holding has been performed for 30 minutes, the temperature is cooled to 30° C. at 0.5° C./min (i.e., second cooling).

Subsequently, the solid content is separated by filtration, cleaned with ion-exchange water, and then dried. Hereby, toner particles (1) having a volume average particle size of 5.9 μm are prepared.

Addition of External Additive

With 100 parts of the toner particles (1), 1.5 parts of hydrophobic silica "RY50" produced by Nippon Aerosil Co., Ltd. is mixed. The resulting mixture is stirred with a sample mill at a rotation speed of 10,000 rpm for 30 seconds. Then, sieving is performed with a vibration sieve having an opening of 45 μm. Hereby, a toner (1) is prepared. The toner (1) has a volume average particle size of 5.9 μm.

Measurement of Net Intensities $N_{Na}$ and $N_{Cl}$

Using the toner (1) as an sample, an all-element analysis is conducted with an X-ray analyzer "ZSX Primus II" produced by Rigaku Corporation in order to determine the Net intensities (unit: kcps) of Na and Cl elements.

Measurement of Domains in Toner Particles

The domains included in the toner particles are measured in accordance with the method described above. The toner prepared in Example 1 includes toner particles that satisfy all of the conditions (A), (B1), (B2), (C), (D), and (E). The proportion of such toner particles to the entire toner particles is 70% or more by number.

Preparation of Carrier

After 500 parts of spherical magnetite powder particles (volume average particle size: 0.55 μm) have been stirred with a Henschel mixer, 5 parts of a titanate coupling agent is added to the magnetite powder particles. The resulting mixture is heated to 100° C. and then stirred for 30 minutes. Subsequently, 6.25 parts of phenol, 9.25 parts of 35% formalin, 500 parts of the magnetite particles treated with a titanate coupling agent, 6.25 parts of 25% ammonia water, and 425 parts of water are charged into a four-necked flask. While stirring is performed, a reaction is conducted at 85° C. for 120 minutes. Subsequently, the temperature is reduced to 25° C. After 500 parts of water has been added to the flask, the supernatant is removed and the precipitate is cleaned with water. The cleaned precipitate is dried by being heated under reduced pressure. Hereby, a carrier (M) having an average particle size of 35 μm is prepared.

Mixing of Toner and Carrier

The toner (1) and the carrier (M) are charged into a V-blender at a mass ratio of Toner (1):Carrier (M)=5:95. The resulting mixture is stirred for 20 minutes to form a developer (1).

Examples 2 to 6

Toner particle samples (2) to (6) are prepared as in the preparation of the toner particles (1), except that the amount of the aqueous ammonium chloride solution used is increased.

Toners (2) to (6) and developers (2) to (6) are prepared as in the preparation of the toner (1) and the developer (1), except that a specific one of the toner particle samples (2) to (6) is used instead of the toner particles (1).

Comparative Examples 1 and 2

Toner particle samples (C1) and (C2) are prepared as in the preparation of the toner particles (1), except that the amount of the aqueous ammonium chloride solution used is changed.

Toners (C1) and (C2) and developers (C1) and (C2) are prepared as in the preparation of the toner (1) and the developer (1), except that a specific one of the toner particle samples (C1) and (C2) is used instead of the toner particles (1).

Example 7

Preparation of Toner Particles
Ion-exchange water: 200 parts
Amorphous polyester resin particle dispersion liquid (A1): 130 parts
Crystalline polyester resin particle dispersion liquid (B1): 60 parts
Styrene acrylic resin particle dispersion liquid (C1): 30 parts
Release agent particle dispersion liquid (W1): 10 parts
Colorant particle dispersion liquid ($K_1$): 15 parts
Anionic surfactant "TaycaPower" produced by TAYCA CORPORATION: 2.8 parts The above materials are charged into a round-bottom flask made of stainless steel. After the pH has been adjusted to be 3.5 by addition of 0.1 N (0.1 mol/L) nitric acid, an aqueous solution prepared by dissolving 2.5 parts of aluminum sulfate in 30 parts of ion-exchange water is added to the flask. After dispersion has been performed with a homogenizer "ULTRA-TURRAX T50" produced by IKA at 30° C., the temperature is increased to 45° C. in a heating oil bath. Then, holding is performed until the volume average particle size reaches 5.0 μm.

Subsequently, 160 parts of the amorphous polyester resin particle dispersion liquid (A1) and 20 parts of an aqueous ammonium chloride solution prepared by dissolving 20 parts of ammonium chloride in 80 parts of ion-exchange water are added. The pH is adjusted to be 9.0 using a 1 N aqueous sodium hydroxide solution. Subsequently, while stirring is continued, the temperature is increased to 85° C. at a heating rate of 0.05° C./min. After holding has been performed at 85° C. for 3 hours, the temperature is reduced to 30° C. at 0.5° C./min. Subsequently, the solid content is separated by filtration, cleaned with ion-exchange water, and then dried. Hereby, toner particles (7) having a volume average particle size of 5.9 μm are prepared.

Addition of External Additive

With 100 parts of the toner particles (7), 1.5 parts of hydrophobic silica "RY50" produced by Nippon Aerosil Co., Ltd. is mixed. The resulting mixture is stirred with a sample mill at a rotation speed of 10,000 rpm for 30 seconds. Then, sieving is performed with a vibration sieve having an opening of 45 μm. Hereby, a toner (7) is prepared. The toner (7) has a volume average particle size of 5.9 μm.

Measurement of Net Intensities $N_{Na}$ and $N_{Cl}$

Using the toner (7) as an sample, an all-element analysis is conducted with an X-ray analyzer "ZSX Primus II" produced by Rigaku Corporation in order to determine the Net intensities (unit: kcps) of Na and Cl elements.

Measurement of Domains in Toner Particles

The domains included in the toner particles are measured in accordance with the method described above. The toner prepared in Example 7 does not include either the first toner particles or the second toner particles.

Mixing of Toner and Carrier

The toner (7) and the carrier (M) are charged into a V-blender at a mass ratio of Toner (7):Carrier (M)=5:95. The resulting mixture is stirred for 20 minutes to form a developer (7).

Developer Performance Evaluations

Degree of Fixation of Halftone Image

A modification machine of an image forming apparatus "ApeosPort IV C5575" produced by Fuji Xerox Co., Ltd. is prepared. A specific one of the developers is charged into the developing device. The image forming apparatus is left to stand for 1 day at a temperature of 25° C. and a relative humidity of 15%. Subsequently, under the same conditions as above, a halftone image having an area coverage of 5% is formed on 100 sheets of "P Paper" produced by Fuji Xerox Co., Ltd.

Subsequently, the weights of first and hundredth sheets are measured. After the halftone images have been rubbed with "Kimwipe" produced by NIPPON PAPER CRECIA CO., LTD., the weights of the sheets are measured again. The weight maintenance ratio (Weight after rubbing/Weight before rubbing×100, unit: %) is calculated from the weights of the sheets measured before and after the images have been rubbed. Furthermore, the change in image density caused due to the rubbing is visually inspected. The weight maintenance ratio and the image density change are classified as described below.

G1: In both of the first and hundredth sheets, the weight maintenance ratio is 99.5% or more and the change in image density caused due to the rubbing is not confirmed.

G2: In both of the first and hundredth sheets, the weight maintenance ratio is 99.5% or more and the change in image density caused due to the rubbing is confirmed slightly.

G3: In both of the first and hundredth sheets, the weight maintenance ratio is 98.0% or more and less than 99.5% and the change in image density caused due to the rubbing is confirmed.

G4: In both of the first and hundredth sheets, the weight maintenance ratio is 97.0% or more and less than 98.0% and the change in image density caused due to the rubbing is confirmed.

G5: In both of the first and hundredth sheets, the weight maintenance ratio is less than 97.0% and the change in image density caused due to the rubbing is confirmed.

Transfer Efficiency in Second Transfer

A modification machine of an image forming apparatus "ApeosPort IV C5575" produced by Fuji Xerox Co., Ltd. is prepared. A specific one of the developers is charged into the developing device. The image forming apparatus is left to stand for 1 day at a temperature of 30° C. and a relative humidity of 85%. Subsequently, under the same conditions as above, an image having an area coverage of 1% is formed on 10,000 sheets of "P Paper" produced by Fuji Xerox Co., Ltd. Then, a 3 cm×4 cm solid patch image is developed and transferred to an intermediate transfer belt. The toner image transferred on the intermediate transfer belt is taken with an adhesive tape by taking advantage of the adhesion of the surface of the adhesive tape in order to measure the weight W1 of the transferred toner image. Subsequently, the 3 cm×4 cm solid patch image is formed on a sheet of P Paper, and the weight W2 of the image is measured. The transfer efficiency (W2/W1×100, unit: %) is calculated from the above weights and classified as described below.

A: Transfer efficiency is 90% or more.
B: Transfer efficiency is 80% or more and less than 90%.
C: Transfer efficiency is less than 80%.

TABLE 1

| Toner and developer No. | | Volume average size of toner particles μm | Net intensity of Na $N_{Na}$ kcps | Net intensity of Cl $N_{Cl}$ kcps | $N_{Cl}/N_{Na}$ — | Proportion of first toner particles Number % | Proportion of second toner particles Number % | Degree of fixation of halftone image — | Transfer efficiency — |
|---|---|---|---|---|---|---|---|---|---|
| Comparative example 1 | (C1) | 6.0 | 0.045 | 0.05 | 1.1 | ≥70 | ≥70 | G5 | A |
| Example 1 | (1) | 5.9 | 0.040 | 0.10 | 2.5 | ≥70 | ≥70 | G3 | A |
| Example 2 | (2) | 6.1 | 0.030 | 0.12 | 4.0 | ≥70 | ≥70 | G2 | A |
| Example 3 | (3) | 6.0 | 0.020 | 0.18 | 9.0 | ≥70 | ≥70 | G2 | A |
| Example 4 | (4) | 5.9 | 0.040 | 0.60 | 15.0 | ≥70 | ≥70 | G1 | A |
| Example 5 | (5) | 6.3 | 0.020 | 1.10 | 55.0 | ≥70 | ≥70 | G1 | B |
| Example 6 | (6) | 6.1 | 0.005 | 1.30 | 260.0 | ≥70 | ≥70 | G1 | B |
| Comparative example 2 | (C2) | 5.9 | 0.004 | 1.50 | 375.0 | ≥70 | ≥70 | G1 | C |
| Example 7 | (7) | 5.9 | 0.040 | 0.60 | 15.0 | 0 | 0 | G4 | A |

Examples 101 to 129

Toner particles (101) to (129) are prepared as in the preparation of the toner particles (1), except that the type of the release agent used, the amount of the resin particle dispersion liquid used in the second aggregated particle formation step, the amount of the resin particle dispersion liquid used in the third aggregated particle formation step, and the fusion coalescence step are adjusted such that the crystalline resin domains and the release agent domains included in the toner particles have the properties described in Tables 3 and 4. The cooling rate at which the first cooling is performed in the fusion coalescence step, the temperature at which holding is performed subsequent to reheating in the fusion coalescence step, and the cooling rate at which the second cooling is performed in the fusion coalescence step are set as described in Table 2.

Toners (101) to (129) and developers (101) to (129) are prepared as in the preparation of the toner (1) and the developer (1), except that a specific one of the toner particle samples (101) to (129) is used instead of the toner particles (1).

Using each of the toners (101) to (129) as an sample, an all-element analysis is conducted with an X-ray analyzer "ZSX Primus II" produced by Rigaku Corporation in order to determine the Net intensities (unit: kcps) of Na and Cl elements. The analysis results confirm that the Net intensities $N_{Na}$ and $N_{Cl}$ of Na and Cl elements in each of the toners prepared in Examples 101 to 129 satisfy $2.5 \leq N_{Cl}/N_{Na} \leq 260.0$.

TABLE 2

| | D50v of core aggregated particles (μm) | Cooling rate in first cooling | Holding temperature after reheating | Cooling rate in second cooling | D50v of final toner particles (μm) |
|---|---|---|---|---|---|
| Example 101 | 4.9 | 15° C./min | 80° C. | 0.5° C./min | 5.8 |
| Example 102 | 4.9 | 15° C./min | 92° C. | 0.5° C./min | 5.9 |
| Example 103 | 4.9 | 15° C./min | 80° C. | 0.5° C./min | 5.8 |
| Example 104 | 4.9 | 15° C./min | 80° C. | 0.5° C./min | 5.7 |
| Example 105 | 4.9 | 5° C./min | 92° C. | 1° C./min | 5.8 |
| Example 106 | 4.9 | 15° C./min | 92° C. | 1° C./min | 5.8 |
| Example 107 | 4.9 | 5° C./min | 92° C. | 0.5° C./min | 5.8 |
| Example 108 | 4.9 | 5° C./min | 80° C. | 1° C./min | 5.8 |
| Example 109 | 4.9 | 15° C./min | 80° C. | 1° C./min | 5.8 |
| Example 110 | 4.9 | 5° C./min | 80° C. | 0.5° C./min | 5.8 |
| Example 111 | 3.4 | 5° C./min | 92° C. | 1° C./min | 4.1 |
| Example 112 | 3.4 | 10° C./min | 92° C. | 1° C./min | 4.0 |
| Example 113 | 3.4 | 15° C./min | 92° C. | 1° C./min | 4.1 |
| Example 114 | 3.4 | 10° C./min | 92° C. | 1.5° C./min | 4.1 |
| Example 115 | 3.4 | 15° C./min | 92° C. | 1.5° C./min | 4.2 |
| Example 116 | 3.4 | 5° C./min | 80° C. | 1° C./min | 4.1 |
| Example 117 | 3.4 | 15° C./min | 80° C. | 1° C./min | 4.1 |
| Example 118 | 3.4 | 5° C./min | 80° C. | 0.5° C./min | 4.1 |
| Example 119 | 3.4 | 15° C./min | 80° C. | 0.5° C./min | 4.1 |
| Example 120 | 6.9 | 15° C./min | 92° C. | 1° C./min | 8.0 |
| Example 121 | 6.9 | 15° C./min | 92° C. | 0.7° C./min | 8.1 |
| Example 122 | 6.9 | 5° C./min | 92° C. | 0.3° C./min | 8.0 |
| Example 123 | 6.9 | 15° C./min | 92° C. | 0.3° C./min | 8.2 |
| Example 124 | 6.9 | 15° C./min | 80° C. | 1° C./min | 8.0 |
| Example 125 | 6.9 | 15° C./min | 80° C. | 0.7° C./min | 8.0 |
| Example 126 | 6.9 | 5° C./min | 80° C. | 0.3° C./min | 8.1 |
| Example 127 | 6.9 | 15° C./min | 80° C. | 0.3° C./min | 8.0 |
| Example 128 | 4.9 | 15° C./min | 80° C. | 15° C./min | 5.8 |
| Example 129 | — | 1° C./min | — | — | 5.8 |

TABLE 3

| | D50v of toner particles μm | Crystalline resin domain A | | | | Crystalline resin domain B | | | | Angle at which extensions of major axes of A and B intersect each other θ_B degree | Release agent domain | |
|---|---|---|---|---|---|---|---|---|---|---|---|---|
| | | Aspect ratio AR — | Major axis length L_cry μm | Ratio of major axis length to maximum diameter of toner particle % | Angle formed by major axis and tangent θ_A degree | Aspect ratio AR — | Major axis length L_cry μm | Ratio of major axis length to maximum diameter of toner particle % | Angle formed by major axis and tangent θ_A degree | | Type | Shortest distance nm |
| Example 101 | 5.8 | 32 | 1.5 | 26 | 89 | 23 | 1.1 | 19 | 85 | 75 | Ester wax | 60 |
| Example 102 | 5.9 | 31 | 1.4 | 24 | 88 | 27 | 1.3 | 22 | 72 | 69 | Ester wax | 30 |
| Example 103 | 5.8 | 22 | 1.1 | 19 | 84 | 25 | 1.2 | 21 | 81 | 76 | Paraffin wax | 60 |
| Example 104 | 5.7 | 27 | 1.3 | 23 | 86 | 20 | 0.9 | 16 | 80 | 63 | Polyethylene wax | 70 |
| Example 105 | 5.8 | 17 | 0.8 | 14 | 85 | 13 | 0.6 | 10 | 75 | 77 | Ester wax | 20 |
| Example 106 | 5.8 | 19 | 0.9 | 16 | 80 | 15 | 0.7 | 12 | 76 | 83 | Ester wax | 30 |
| Example 107 | 5.8 | 32 | 1.5 | 26 | 88 | 23 | 1.2 | 21 | 82 | 75 | Ester wax | 30 |
| Example 108 | 5.8 | 14 | 0.7 | 12 | 88 | 17 | 0.8 | 14 | 77 | 53 | Ester wax | 60 |
| Example 109 | 5.8 | 13 | 0.6 | 10 | 80 | 19 | 0.9 | 16 | 69 | 82 | Ester wax | 70 |
| Example 110 | 5.8 | 21 | 1.0 | 17 | 86 | 27 | 1.3 | 22 | 80 | 61 | Ester wax | 50 |
| Example 111 | 4.1 | 16 | 0.7 | 17 | 87 | 11 | 0.5 | 12 | 76 | 48 | Ester wax | 20 |
| Example 112 | 4.0 | 13 | 0.6 | 15 | 82 | 17 | 0.8 | 20 | 80 | 67 | Ester wax | 20 |
| Example 113 | 4.1 | 27 | 1.3 | 32 | 88 | 22 | 1.1 | 27 | 73 | 82 | Ester wax | 20 |
| Example 114 | 4.1 | 10 | 0.4 | 10 | 83 | 11 | 0.5 | 12 | 72 | 52 | Ester wax | 20 |
| Example 115 | 4.2 | 5 | 0.3 | 7 | 86 | 9 | 0.4 | 10 | 81 | 73 | Ester wax | 20 |
| Example 116 | 4.1 | 23 | 0.5 | 12 | 88 | 20 | 0.7 | 17 | 75 | 76 | Ester wax | 60 |
| Example 117 | 4.1 | 20 | 0.8 | 20 | 86 | 30 | 0.5 | 12 | 82 | 81 | Ester wax | 60 |
| Example 118 | 4.1 | 27 | 1.3 | 32 | 82 | 29 | 1.4 | 34 | 73 | 69 | Ester wax | 60 |
| Example 119 | 4.1 | 22 | 1.4 | 34 | 87 | 26 | 1.1 | 27 | 80 | 72 | Ester wax | 60 |
| Example 120 | 8.0 | 10 | 0.5 | 6 | 88 | 15 | 0.6 | 8 | 75 | 73 | Ester wax | 40 |
| Example 121 | 8.1 | 20 | 1.0 | 12 | 86 | 9 | 0.5 | 6 | 79 | 69 | Ester wax | 40 |
| Example 122 | 8.0 | 38 | 1.8 | 23 | 82 | 29 | 1.4 | 18 | 76 | 76 | Ester wax | 40 |
| Example 123 | 8.2 | 31 | 1.5 | 18 | 85 | 36 | 1.7 | 21 | 80 | 53 | Ester wax | 40 |
| Example 124 | 8.0 | 14 | 0.6 | 8 | 83 | 25 | 0.5 | 6 | 81 | 64 | Ester wax | 60 |
| Example 125 | 8.0 | 22 | 1.1 | 14 | 84 | 17 | 0.8 | 10 | 76 | 73 | Ester wax | 60 |
| Example 126 | 8.1 | 38 | 1.8 | 22 | 85 | 35 | 1.7 | 21 | 68 | 68 | Ester wax | 60 |
| Example 127 | 8.0 | 33 | 1.6 | 20 | 86 | 34 | 1.7 | 21 | 72 | 82 | Ester wax | 60 |
| Example 128 | 5.8 | 3 | 0.25 | 4 | 52 | 2 | 0.2 | 3 | 38 | 52 | Ester wax | 60 |
| Example 129 | 5.8 | 16 | 0.8 | 14 | 88 | 14 | 0.7 | 12 | 87 | 2 | Ester wax | 20 |

TABLE 4

| | Proportion of toner particles satisfying conditions (number %) | | | | | | | | Evaluation Degree of fixation of halftone image |
|---|---|---|---|---|---|---|---|---|---|
| | First toner particles A | First toner particles A satisfying Condition E | First toner particles B | First toner particles B satisfying Condition E | Second toner particles A | Second toner particles A satisfying Condition E | Second toner particles B | Second toner particles B satisfying Condition E | |
| Example 101 | 94 | 87 | 77 | 73 | 92 | 83 | 76 | 72 | G1 |
| Example 102 | 81 | 0 | 75 | 0 | 78 | 0 | 70 | 0 | G3 |
| Example 103 | 82 | 75 | 74 | 70 | 79 | 74 | 73 | 71 | G2 |
| Example 104 | 86 | 83 | 76 | 73 | 83 | 79 | 74 | 70 | G2 |
| Example 105 | 37 | 0 | 26 | 0 | 34 | 0 | 24 | 0 | G3 |
| Example 106 | 47 | 0 | 35 | 0 | 42 | 0 | 32 | 0 | G3 |
| Example 107 | 77 | 0 | 53 | 0 | 72 | 0 | 47 | 0 | G3 |
| Example 108 | 27 | 26 | 18 | 18 | 25 | 24 | 16 | 15 | G2 |
| Example 109 | 51 | 50 | 37 | 35 | 43 | 40 | 29 | 25 | G2 |
| Example 110 | 72 | 65 | 48 | 44 | 67 | 61 | 45 | 41 | G1 |
| Example 111 | 28 | 0 | 22 | 0 | 38 | 0 | 31 | 0 | G3 |
| Example 112 | 51 | 0 | 43 | 0 | 63 | 0 | 52 | 0 | G3 |
| Example 113 | 72 | 0 | 67 | 0 | 84 | 0 | 73 | 0 | G3 |
| Example 114 | 0 | 0 | 0 | 0 | 44 | 0 | 31 | 0 | G3 |
| Example 115 | 7 | 0 | 9 | 0 | 54 | 0 | 42 | 0 | G3 |
| Example 116 | 37 | 34 | 26 | 24 | 38 | 35 | 27 | 25 | G2 |
| Example 117 | 48 | 43 | 40 | 34 | 52 | 47 | 35 | 29 | G2 |
| Example 118 | 75 | 72 | 63 | 59 | 75 | 72 | 63 | 59 | G1 |
| Example 119 | 83 | 79 | 76 | 71 | 83 | 79 | 76 | 71 | G1 |
| Example 120 | 49 | 0 | 42 | 0 | 7 | 0 | 3 | 0 | G3 |
| Example 121 | 48 | 0 | 43 | 0 | 52 | 0 | 48 | 0 | G3 |
| Example 122 | 68 | 0 | 64 | 0 | 74 | 0 | 71 | 0 | G3 |

TABLE 4-continued

| | Proportion of toner particles satisfying conditions (number %) | | | | | | | | |
|---|---|---|---|---|---|---|---|---|---|
| | First toner particles A | First toner particles A satisfying Condition E | First toner particles B | First toner particles B satisfying Condition E | Second toner particles A | Second toner particles A satisfying Condition E | Second toner particles B | Second toner particles B satisfying Condition E | Evaluation Degree of fixation of halftone image |
| Example 123 | 81 | 0 | 74 | 0 | 85 | 0 | 81 | 0 | G3 |
| Example 124 | 48 | 41 | 45 | 42 | 6 | 6 | 2 | 2 | G2 |
| Example 125 | 52 | 44 | 43 | 41 | 51 | 48 | 46 | 43 | G2 |
| Example 126 | 68 | 64 | 60 | 56 | 76 | 73 | 71 | 66 | G1 |
| Example 127 | 79 | 77 | 71 | 69 | 86 | 82 | 79 | 75 | G1 |
| Example 128 | 0 | 0 | 0 | 0 | 0 | 0 | 0 | 0 | G4 |
| Example 129 | 0 | 0 | 0 | 0 | 0 | 0 | 0 | 0 | G3 |

The symbols and the like used in Tables 3 and 4 mean the following items.

First toner particles A: toner particles that satisfy the conditions (A), (B1), (C), and (D).

First toner particles B: toner particles that satisfy the conditions (A'), (B1'), (C'), and (D').

Condition (A'): the crystalline resin domain has an aspect ratio of 10 or more and 40 or less.

Condition (B1'): the crystalline resin domain has a major axis length of 0.8 μm or more and 1.5 μm or less.

Condition (C'): the angle formed by an extension of the major axis of the crystalline resin domain and a tangent to the surface of the toner particle at a point at which the extension intersects the surface of the toner particle is 75° or more and 90° or less.

Condition (D'): the angle at which extensions of the major axes of two crystalline resin domains intersect each other is 60° or more and 90° or less.

Second toner particles A: toner particles that satisfy the conditions (A), (B2), (C), and (D).

Second toner particles B: toner particles that satisfy the conditions (A'), (B2'), (C'), and (D').

Condition (A'): the crystalline resin domain has an aspect ratio of 10 or more and 40 or less.

Condition (B2'): the ratio of the major axis length of the crystalline resin domain to the maximum diameter of the toner particle is 13% or more and 30% or less.

Condition (C'): the angle formed by an extension of the major axis of the crystalline resin domain and a tangent to the surface of the toner particle at a point at which the extension intersects the surface of the toner particle is 75° or more and 90° or less.

Condition (D'): the angle at which extensions of the major axes of two crystalline resin domains intersect each other is 60° or more and 90° or less.

AR: the aspect ratio of the crystalline resin domain $L_{Cry}$: the major axis length of the crystalline resin domain $\theta_A$: the angle formed by an extension of the major axis of the crystalline resin domain and a tangent to surface of the toner particle at a point at which the extension intersects the surface of the toner particle $\theta_B$: the angle at which extensions of the major axes of two crystalline resin domains intersect each other Shortest distance: the shortest distance between the release agent domain and the surface (i.e., outer periphery) of a toner particle Ester wax: "WEP-5" produced by NOF CORPORATION, melting temperature: 85° C.

Paraffin wax: "HNP-0190" produced by Nippon Seiro Co., Ltd., melting temperature: 89° C.

Polyethylene wax: melting temperature: 89° C.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrostatic image developing toner comprising:
an amorphous polyester resin; and
a crystalline polyester resin,
wherein a Net intensity $N_{Na}$ of a Na element and a Net intensity $N_{Cl}$ of a Cl element, the Net intensities $N_{Na}$ and $N_{Cl}$ being determined by X-ray fluorescence analysis, satisfy $2.5 \leq N_{Cl}/N_{Na} \leq 260.0$,
wherein in a cross-sectional observation of the toner particles, there are toner particles in which at least two domains of the crystalline resin satisfy at least one of condition (B1) and condition (B2) below:
condition (B1) that each domain of the crystalline resin measures 0.5 μm or more and 1.5 μm or less along a major axis thereof;
condition (B2) that at least one of the two domains of the crystalline resin measures that along a major axis thereof that 10% or more and 30% or less of a longest diameter of the toner particle, and
in a cross-sectional observation of the toner particles, there are toner particles in which at least two domains of the crystalline resin satisfy the conditions (A), (C), and (D) below:
condition (A) that each domain of the crystalline resin has an aspect ratio of 5 or more and 40 or less;
condition (C) that a line extended from the major axis of each domain of the crystalline resin makes an angle of 60° or more and 90° or less with a tangent to a surface of the toner particle at a point of contact between the extended line and the surface; and
condition (D) that lines extended from the major axis of the two domains of the crystalline resin cross each other at an angle of 45° or more and 90° or less.

2. The electrostatic image developing toner according to claim 1, wherein the Net intensity $N_{Na}$ and the Net intensity $N_{Cl}$ satisfy $4.0 \leq N_{Cl}/N_{Na} \leq 60.0$.

3. The electrostatic image developing toner according to claim 1, wherein the Net intensity $N_{Cl}$ is 0.10 kcps or more and 1.30 kcps or less.

4. The electrostatic image developing toner according to claim 3, wherein the Net intensity $N_{Cl}$ is 0.12 kcps or more and 1.10 kcps or less.

5. The electrostatic image developing toner according to claim 1, wherein the Net intensity $N_{Na}$ is 0.005 kcps or more and 0.040 kcps or less.

6. The electrostatic image developing toner according to claim 5, wherein the Net intensity $N_{Na}$ is 0.010 kcps or more and 0.030 kcps or less.

7. The electrostatic image developing toner according to claim 1, wherein the crystalline polyester resin includes a polymer of an α,ω-linear aliphatic dicarboxylic acid with an α,ω-linear aliphatic diol.

8. The electrostatic image developing toner according to claim 7, wherein the polymer of an α,ω-linear aliphatic dicarboxylic acid with an α,ω-linear aliphatic diol includes a polymer of 1,10-decanedicarboxylic acid with 1,6-hexanediol.

9. The electrostatic image developing toner according to claim 1, the electrostatic image developing toner further comprising a release agent, the release agent including an ester wax.

10. The electrostatic image developing toner according to claim 1, wherein the toner particle includes a release agent, and wherein, when a cross section of the toner particle is observed, a domain composed of the release agent is present at a position 50 nm or more below the surface of the toner particle.

11. The electrostatic image developing toner according to claim 1, wherein a proportion of the toner particle to entire toner particles is 40% or more by number.

12. The electrostatic image developing toner according to claim 11, wherein the proportion of the toner particle to the entire toner particles is 70% or more by number.

13. An electrostatic image developer comprising the electrostatic image developing toner according to claim 1.

14. A toner cartridge detachably attachable to an image forming apparatus, the toner cartridge comprising the electrostatic image developing toner according to claim 1.

* * * * *